(12) United States Patent
Brown et al.

(10) Patent No.: US 10,601,931 B2
(45) Date of Patent: *Mar. 24, 2020

(54) SYSTEMS AND METHODS FOR DELIVERING INFORMATION AND USING COORDINATING IDENTIFIERS

(71) Applicants: Spencer Brown, Pierceton, IN (US); Joseph Almasy, Incline Village, NV (US); Jason Baty, Murray, UT (US)

(72) Inventors: Spencer Brown, Pierceton, IN (US); Joseph Almasy, Incline Village, NV (US); Jason Baty, Murray, UT (US)

(73) Assignee: J2B2, LLC, Leesburg, IN (US)

( * ) Notice: Subject to any disclaimer, the term of this patent is extended or adjusted under 35 U.S.C. 154(b) by 458 days.

This patent is subject to a terminal disclaimer.

(21) Appl. No.: 15/284,387

(22) Filed: Oct. 3, 2016

(65) Prior Publication Data
US 2018/0097896 A1    Apr. 5, 2018

(51) Int. Cl.
*H04L 29/08* (2006.01)
*H04W 4/21* (2018.01)
*H04W 4/029* (2018.01)

(52) U.S. Cl.
CPC ............ *H04L 67/18* (2013.01); *H04W 4/029* (2018.02); *H04W 4/21* (2018.02)

(58) Field of Classification Search
CPC . H04L 67/18; H04L 61/609; G08G 1/20–205; G01C 21/3438–3626; G06Q 20/382; H04W 4/029–21
See application file for complete search history.

(56) References Cited

U.S. PATENT DOCUMENTS

| 4,773,171 A | 9/1988 | Babbitt |
| 6,934,548 B1 * | 8/2005 | Gould ...................... G01S 5/04 455/456.1 |

(Continued)

FOREIGN PATENT DOCUMENTS

| EP | 3141005 A1 | 3/2017 |
| KR | 10-2003-0089958 | 9/2006 |

(Continued)

OTHER PUBLICATIONS

Google Scholar search results—coordinate taxi pickup by displaying notifications (Year: 2019).*

(Continued)

*Primary Examiner* — Kostas J Katsikis
(74) *Attorney, Agent, or Firm* — David B. Tingey; Bryant J. Keller; Kirton McConkie

(57) ABSTRACT

Systems and methods for allowing separate parties to identify each other through the use of matching computer-coordinated identifiers are discussed. In some cases, the methods include using a processor of a computer system to identify a first computer device configured to provide a first perceptible identifier, using the processor to identify a second computer device that is configured to provide a second perceptible identifier, and using the processor to send the first perceptible identifier to the first computer device and the second perceptible identifier to the second computer device, wherein the first and second perceptible identifiers correspond with each other to provide a two-sided, computer-coordinated verification. In some cases, the described methods include modifying the first and second identifiers as the first and second computer devices come into proximity with each other. Other implementations are discussed.

20 Claims, 19 Drawing Sheets

(56) References Cited

U.S. PATENT DOCUMENTS

| | | | |
|---|---|---|---|
| 7,006,835 B2* | 2/2006 | Otsuka | H04W 4/029 455/456.1 |
| 7,366,329 B2 | 4/2008 | Ono | |
| 7,623,842 B2* | 11/2009 | Levitan | G01S 5/0081 455/404.2 |
| 8,447,322 B2* | 5/2013 | Morrill | H04W 4/90 455/456.1 |
| 8,457,612 B1* | 6/2013 | Daniell | H04W 4/029 455/466 |
| 8,566,957 B2 | 10/2013 | Nandakumar | |
| 8,650,636 B2 | 2/2014 | Johnson et al. | |
| 8,667,560 B2 | 3/2014 | Albisu | |
| 8,695,071 B2 | 4/2014 | Nandakumar | |
| 8,898,250 B2* | 11/2014 | Callahan | G06Q 30/02 709/217 |
| 8,913,999 B1 | 12/2014 | Ramzanali | |
| 8,935,226 B2* | 1/2015 | Stevens | G06F 21/6218 707/705 |
| 8,973,095 B2 | 3/2015 | Smith | |
| 9,519,900 B2 | 12/2016 | Fredell et al. | |
| 9,716,683 B2 | 7/2017 | Liao | |
| 9,769,781 B2* | 9/2017 | Morrill | H04W 4/90 |
| 9,893,903 B2* | 2/2018 | Ickman | H04W 4/21 |
| 10,093,252 B2* | 10/2018 | Zych | B60R 16/037 |
| 2004/0103431 A1 | 5/2004 | Davenport | |
| 2007/0159322 A1* | 7/2007 | Garratt Campbell | G08B 25/016 340/539.13 |
| 2007/0216960 A1 | 9/2007 | Ohtani | |
| 2008/0102856 A1 | 5/2008 | Fortescue | |
| 2008/0119203 A1* | 5/2008 | Shalmon | H04W 4/029 455/456.2 |
| 2009/0210148 A1* | 8/2009 | Jayanthi | G01C 21/26 701/467 |
| 2009/0215469 A1 | 8/2009 | Fisher | |
| 2010/0151879 A1* | 6/2010 | Morrill | H04W 4/90 455/456.1 |
| 2010/0240381 A1 | 9/2010 | Yamada | |
| 2011/0010340 A1 | 1/2011 | Hung | |
| 2012/0008526 A1 | 1/2012 | Borghei | |
| 2012/0130627 A1* | 5/2012 | Islam | G06Q 10/08 701/300 |
| 2012/0220314 A1 | 8/2012 | Altman | |
| 2012/0265858 A1 | 10/2012 | Mohnen | |
| 2013/0185368 A1* | 7/2013 | Nordstrom | H04W 4/21 709/206 |
| 2013/0237183 A1* | 9/2013 | Morrill | H04W 4/90 455/404.2 |
| 2013/0282590 A1 | 10/2013 | Rajarethnam | |
| 2013/0316743 A1 | 11/2013 | Emigh | |
| 2014/0081879 A1 | 3/2014 | Olson | |
| 2014/0207959 A1 | 7/2014 | Kamali | |
| 2015/0179145 A1 | 6/2015 | Martin | |
| 2015/0195235 A1 | 7/2015 | Trussel | |
| 2015/0312404 A1 | 10/2015 | Abramson | |
| 2015/0323336 A1* | 11/2015 | Lord | G06Q 10/06 705/7.15 |
| 2015/0332573 A1* | 11/2015 | Selmanovic | H04L 67/1095 455/457 |
| 2016/0034682 A1 | 2/2016 | Fiske | |
| 2016/0071476 A1 | 3/2016 | Jeon | |
| 2016/0092939 A1* | 3/2016 | Beattie, Jr. | H04L 65/605 705/14.66 |
| 2016/0219012 A1 | 7/2016 | Liao | |
| 2016/0232451 A1 | 8/2016 | Scherzer | |
| 2016/0265928 A1 | 9/2016 | Samuel | |
| 2016/0286393 A1 | 9/2016 | Rasheed | |
| 2016/0364678 A1* | 12/2016 | Cao | G06Q 50/30 |
| 2017/0024917 A1 | 1/2017 | Deitrich | |
| 2017/0041886 A1* | 2/2017 | Baker | H04W 76/14 |
| 2017/0195940 A1* | 7/2017 | Boss | H04W 40/22 |
| 2017/0301308 A1* | 10/2017 | Yang | G09G 5/003 |
| 2018/0060778 A1* | 3/2018 | Guo | G01C 21/343 |
| 2018/0097895 A1* | 4/2018 | Brown | H04L 63/0869 |
| 2018/0097896 A1* | 4/2018 | Brown | H04L 67/18 |
| 2018/0098194 A1 | 4/2018 | Brown | |
| 2018/0231984 A1* | 8/2018 | Alonso-Mora | G05D 1/0291 |
| 2019/0007490 A1* | 1/2019 | Lindoff | H04W 4/029 |
| 2019/0035202 A1* | 1/2019 | Brinig | G05D 1/0088 |

FOREIGN PATENT DOCUMENTS

| | | |
|---|---|---|
| KR | 10-2011-0141238 | 7/2013 |
| KR | 10-1282824 | 7/2013 |
| KR | 10-2016-0105282 | 9/2016 |
| WO | 2011001026 A1 | 1/2011 |
| WO | 2013048322 A1 | 4/2013 |
| WO | WO-2014008661 A1 * | 1/2014 |
| WO | 2015169706 A1 | 11/2015 |

OTHER PUBLICATIONS

Google Scholar search results—uberPool (Year: 2019).*
Chelsea, "Enabling seamless Pickups through Color Coding", Dec. 2, 2015. Downloaded from https://www.uber.com/blog/seattle/enabling-seamless-pickups-through-color-coding/ on Oct. 12, 2017.
Lisa Vaas, "I am not a robot: Google swaps text CAPTCHAs for quivery mouse clicks", Dec. 5, 2014. downloaded from https://nakedsecurity.sophos.com/2014/12/05/i-am-not-a-robot-google-swaps-text-captchas-for-quivery-mouse-clicks/ on Jun. 10, 2017.

* cited by examiner

SYSTEMS AND METHODS FOR DELIVERING INFORMATION AND USING COORDINATING IDENTIFIERS

BACKGROUND OF THE INVENTION

1. Field of the Invention

The present invention relates to systems and methods for identifying parties through the use of one or more corresponding, computer-coordinated identifiers. In particular, some implementations of the present invention relate to systems and methods for using a server or other computer system to provide (wirelessly or otherwise) computer-coordinated perceptible identifiers (such as one or more images, light emissions, sounds, touch-perceptible notifications, and/or other suitable identifiers) to two or more computer devices, with the identifiers received by each of the devices coordinating with each other to allow users of such devices to readily match the identifiers and to thereby identify each other. In some implementations, the described systems and methods automatically ensure that coordinating identifiers received by computer devices participating in a first interaction do not coordinate with an identifier provided to another device participating in a second interaction when such other device is within a set proximity from one of more of the computer devices associated with the first interaction. Moreover, in some implementations, the coordinating identifiers received by one or more of the computer devices participating in an interaction are configured to be modified when such devices come into proximity with each other.

2. Background and Related Art

Whether to meet a blind date met on a social media site, to grab a coffee from a busy café, to hail a taxi, to receive a pizza from a pizza deliveryman, to pick up carryout from a restaurant, or for any other of a wide variety of purposes, people regularly find themselves in situations where they need to be sure that the person they are meeting is actually the person they intended to meet.

Currently, people use an assortment of techniques to help ensure that they are meeting the right person. For instance, when a limo driver goes to the airport to pick up an unfamiliar passenger, the driver may hold up a sign displaying the passenger's name. In other instances, people may agree to identify each other by meeting at a specific location (e.g., at a specific address, at a land mark, and/or in any other suitable location). In still other instances, parties may agree to look for an identifying characteristic (e.g., a specific article of clothing, a license plate number, a car make and model, a physical characteristic, etc.) to identify each other. In yet other instances, one party may use a picture of another party (and/or of that other party's car or another object) to identify that other party.

While there are many conventional techniques for identifying parties, such techniques are not necessarily without their shortcomings. Indeed, although some conventional techniques may help two or more parties to meet each other, in many cases, as parties use such techniques they may still question whether they are actually meeting the right person or someone else (e.g., an imposter, an opportunist, etc.). In one example, when a driver waits at an airport holding a sign for John Smith, and a man claims to be John Smith and even has a driver's license corroborating his claim, it may be hard for the driver to be certain that he/she is meeting the intended John Smith.

In another example, when two parties agree to meet in a specific location, and multiple people end up being in that location at the scheduled meeting time, one or both of the two intended parties may (under some conventional techniques) have to approach and interact with multiple people before being able to identify the other intended party. In yet another example, some parties may have a hard time identifying each other in the dark. For instance, if it is dark, it may be difficult for one party to recognize a physical characteristic (e.g., hair color, clothing color, etc.), a license plate number, a car color, and/or another characteristic of the other party—even if one or both of the parties have a photo of the other and/or of a car or other object or person associated with the other party.

Indeed, not only can some conventional techniques for identifying parties leave room for doubt as to whether the intended parties are the ones actually meeting, be unnecessarily time consuming, and place one or more individuals in an awkward situation, in some cases, conventional techniques for identifying parties, can allow one or more individuals to expose themselves to danger by unintentionally believing that another party is actually the intended party. This can be especially true where one party is inviting another (e.g., a purported blind date, repairman, salesman, deliveryman, etc.) into a home, where one party is getting into a car with the other party, or where a person is otherwise trusting another party with that person's safety.

Thus, while techniques currently exist that are used to identify disparate parties, challenges still exist, including those discussed above. Accordingly, it would be an improvement in the art to augment or even replace current techniques with other techniques.

SUMMARY OF THE INVENTION

The present invention relates to systems and methods for identifying parties through the use of one or more corresponding, computer-coordinated identifiers. In particular, some implementations of the present invention relate to systems and methods for using a server or other computer system to provide (wirelessly or otherwise) computer-coordinated perceptible identifiers (such as one or more images, light emissions, sounds, touch-perceptible identifiers, and/or other suitable identifiers) to two or more computer devices, with the identifiers received by each of the devices coordinating with each other to allow users of such devices to readily match the identifiers and to thereby identify each other. In some implementations, the described systems and methods automatically ensure that coordinating identifiers received by computer devices participating in a first interaction do not coordinate with an identifier provided to another device participating in a second interaction when such other device is within a set proximity from one of more of the computer devices associated with the first interaction. Moreover, in some implementations, the coordinating identifiers received by one or more computer devices participating in an interaction are configured to be modified when such devices come into proximity with each other.

Some implementations of the present invention take place in association with a server, cloud, and/or other remote computer system and two or more computer devices (e.g., wireless computer device, smart phones, laptops, etc.) that are configured to communicate with the remote computer system. In some cases, the methods include using a processor of a computer system to identify a first computer device configured to provide a first perceptible identifier; using the processor of the computer system to identify a second computer device that is configured to provide a second perceptible identifier; and using the processor of the computer system to provide the first perceptible identifier to the first computer device and the second perceptible identifier to the second computer device, wherein the first and second perceptible identifiers correspond with each other to provide two-sided, computer-coordinated verification. In other words, some implementations of the described systems and methods provide one or more parties with matching identifiers, allowing such parties to readily and reliably identify each other.

Some implementations of the described invention further embrace a computer program product for implementing within a computer system a method for dynamically identifying parties through use of corresponding identifiers in a manner that solves a technical problem of mis-identifying parties due to a lack of a provision of party-specific information, the computer program product comprising: a computer-readable, non-transitory medium for providing computer program code means utilized to implement the method, wherein the computer program code means comprises executable code for implementing steps for: using a processor of a computer system to identify a first computer device configured to use a processor and a display of the first computer device to provide a first visually perceptible identifier; using the processor of the computer system to identify a second computer device that is configured to use a processor and display of the second computer device to provide a second visually perceptible identifier; using the processor of the computer system to provide the first visually perceptible identifier to the first computer device and the second visually perceptible identifier to the second computer device, wherein the first and second visually perceptible identifiers correspond with each other to provide a computer-coordinated verification for the first computer device and the second computer device; and using the processor of the computer system to correlate a location of the first computer device with a location of the second computer device and to automatically modify the first and second perceptible identifiers on the first and second computer devices when the first and second computer devices are in proximity to each other.

Additionally, some implementations of the described invention include a method for providing coordinating identifiers over a network to multiple remote computer devices, the method comprising: providing a party-identification application for use on a first remote computer device and a second remote computer device; using a server to provide, via a network, a first identifier to the first computer device and a second identifier to the second computer device, wherein the first identifier and the second identifier coordinate with each other, wherein the server comprises a computer processor and a memory that stores information identifying the first identifier provided to the first computer device and the second identifier provided to the second computer device, and wherein the computer processor: determines a location of at least one of the first computer device and the second computer device; determines location of a third computer device; and ensures that the first identifier and the second identifier do not coordinate with a third identifier provided to the third computer device through the server when the third computer device is in potential proximity to the at least one of the first computer device and the second computer device.

In some further implementations, the described systems and methods relate to a method for providing coordinating identifiers over a network to remote computer devices, the method comprising: providing a party-identification application for use on a first remote computer device and a second remote computer device, the application providing a forum for placement of a request from a user of the first device; using a server to place the first device and the second device in a first interaction with each other, to deliver at least a portion of the request from the first device to the second device, to provide a first identifier to the first device, and to provide a second identifier to the second device, wherein the first identifier and second identifier coordinate with each other, wherein the server comprises a computer processor and a memory that stores information identifying the first identifier and the second identifier and wherein the computer processor: determines a location of a third-party computer device pertaining to a third-party interaction; determines a location of at least one of the first device and the second device; and automatically ensures that at least one of the first identifier and the second identifier does not coordinate with a third identifier that is assigned to a third-party interaction when the third-party device is within a set distance from the at least one of the first device and the second device.

In still other implementations, the described systems and methods relate to a method for providing coordinating identifiers over a network to multiple remote computer devices, the method comprising: providing a party-identification application for use on a first remote computer device, a second remote computer device, and a third remote computer device; using a server to link the first and second devices in a first interaction and to provide, via the network, a first set of coordinating identifiers to the first and second devices; using the server to link the second and third devices in a second interaction and to provide, via the network, a second set of coordinating identifiers to the second and third devices, wherein the server comprises a computer processor and a memory that stores information identifying the first and second sets of identifiers, and wherein the computer processor ensures that the first and second sets of coordinating identifiers do not coordinate with each other.

In yet other implementations, the described systems and methods relate to a method for providing coordinating identifiers over a network to multiple remote computer devices, the method comprising: providing a party-identification application for use on a first remote computer device, a second remote computer device, and a third remote computer device; using a server to link the first and second devices in a first interaction and to provide, via the network, a first set of coordinating identifiers to the first and second devices; using the server to link the second and third devices in a second interaction and to provide, via the network, a second set of coordinating identifiers to the second and third devices, wherein the server comprises a computer processor and a memory that stores information identifying the first and second sets of identifiers, wherein the computer processor ensures that the first and second sets of coordinating identifiers do not coordinate with each other, and wherein at least one of the computer processor and a processor of the second device to cause the second device to automatically display an identifier from the first set of identifiers when the first device is closer to the second device than the third device and to automatically display an identifier from the second set of identifiers when the third device is closer to the second device than the first device.

In still other implementations, the described systems and methods relate to a method for providing coordinating identifiers over a network to multiple remote computer devices, the method comprising: providing a party-identification application to a first computer device, a second computer device, and a third computer device; using a processor of a server to link the first, second, and third computer devices in a first interaction, using the processor to provide the first and second devices with a first set of coordinating identifiers; using the processor to provide the second and third devices with a second set of coordinating identifiers; using the processor to determine a location of the first, second, and third devices; and using the processor to automatically ensure that the first set of coordinating identifiers does not coordinate with an identifier of a fourth device pertaining to a second interaction when the fourth device is in proximity with at least one of the first device and the second device.

In some implementations, the described systems and methods relate to a method for providing coordinating identifiers over a network to multiple remote computer devices, the method comprising: providing a party-identification application to a first computer device, a second computer device, a third computer device, a fourth computer device, and a fifth computer device; using a processor of a server to link the first, second, and third devices in a first interaction and to provide the first, second, and third devices with a first set of coordinating identifiers; using the processor of a server to link the second, fourth, and fifth devices in a second interaction and to provide the second, fourth, and fifth devices with a second set of coordinating identifiers; and using the processor to automatically ensure that the first and second sets of identifiers are distinguishable from each other.

In still some additional implementations, the described systems and methods relate to a method for providing coordinating identifiers over a network to multiple remote computer devices, the method comprising: providing a party-identification application to a first computer device, a second computer device, and a third computer device; using a processor of a server to link the first, second, and third computer devices in a first interaction and to provide the first, second, and third devices with a first set of coordinating identifiers; associating an identifier coordinating with the first set of identifiers with an item to be passed from a user of the first device, to a user of the second device, and to a user of the third device; using the processor to determine a location of the first, second, and third devices; and using the processor to automatically ensure that the first set of coordinating identifiers does not coordinate with an identifier of a fourth device pertaining to a second interaction when the fourth device is in proximity with at least one of the first device and the second device.

In some implementations, the described systems and methods are configured to automatically modify (e.g., change, cause to flash, change of speed of the flash, include a message, alternate between identifiers, and/or to otherwise modify) the first and/or second identifiers (and/or any other identifiers in an interaction) as the first and second wireless computer devices (and/or other devices in the interaction) come into proximity with each other. In some implementations, the described systems allow users of one or more of the computer devices involved in an interaction to request that the first and/or second identifiers be dynamically modified to provide additional identity confirmation between the users of the first and second computer devices. Indeed, in some implementations, when a user of a first device requests for an update and/or other modification to the identifier provided by the first device, the coordinating identifiers displayed and/or otherwise provided by other devices in the same interaction as the first device are also updated and/or modified in the same manner as is the identifier provided by the first device.

In some cases, the described systems and methods are further configured to use the processor of the remote computer system (and/or a processor of one or more computer devices) to ensure that a computer device that is not part of a specific interaction but that is in proximity to another device that is part of the interaction does not have an identifier that matches or otherwise coordinates with the identifier provided to the device that is part of that specific interaction. Accordingly, in some implementations, the described systems and methods are configured to prevent parties who are in proximity to each other, but who are not part of the same interaction, from receiving matching identifiers.

In some cases, the described systems and methods are configured to allow a user of one computer device to pass or otherwise send an identifier provided on that user's device to another computer device. Accordingly, in some implementations, one person can pass their identifier to another (e.g., so as to replace the first person in an interaction) and/or one person can add another person to an interaction (e.g., so that the first person continues to be part of the interaction and one or more other people are added to the interaction).

In some instances, the described systems and methods are configured to track at least one of a time, path, distance, and/or other suitable characteristic that can be measured and/or otherwise recorded while two or more computer devices comprising coordinating identifiers (e.g., participating in the same interaction) are in proximity to (and/or out of proximity with) each other.

Although in some implementations, the described systems are configured to provide a first identifier to a first computer device and a second coordinating identifier to a second device, in some other implementations, the described systems and methods include sending coordinating identifiers to virtually any number of computer devices participating in one or more interactions. In one example, the described systems and methods send a first identifier to one person (e.g., a potential driver), while sending a second identifier, which coordinates with the first) to multiple people (e.g., multiple passengers).

In some implementations, the described systems and methods allow at least one of the remote computer system, a first computer device, a second computer device, and/or any other suitable device to provide one or more visual, audio, and/or touch-perceptible identifiers through an object (e.g., a vehicle, watch, ear piece, headset, and/or any other suitable device) that is in signal communication with at least one of the computer device in an interaction. Indeed, in some implementations, the remote computer system, a first computer device, and/or a second computer device are configured to control a car's lights, horn, speakers, and/or other visual and/or audio outputs to help a potential rider identify the car and driver.

In some implementations, the described systems and methods are further configured to use a camera on at least one computer device to identify a person or object associated with another computer device pertaining to the same interaction. While this can be accomplished in any suitable manner, in some embodiments, the described systems and methods include the use of facial, optical, and/or visual recognition technology.

In some implementations, the described systems and methods allow one computer device participating in multiple interactions to receive multiple identifiers (e.g., with each identifier pertaining to a different interaction). In this regard, while a first computer device comprising multiple identifiers can function in any suitable manner, in some implementations, the described systems and methods are configured to cause such a computer device to, by default, display and/or otherwise provide an identifier that coordinates with an identifier provided by another computer device that is in an interaction with the first device and that is closer in proximity to the first device than any other device that is in an interaction with the first device. In some such implementations, once one interaction is completed, the first computer device is configured to provide an identifier that coordinates with an identifier of the next closest device that is in an interaction with the first device.

In some further implementations, the described systems and methods are configured to provide information, reading material, promotional materials, advertisements, pop-up ads, factual information, tourist information, notifications, coupons, and/or any other suitable material through computer devices functioning in accordance with the described systems and methods. Indeed, in some implementations, the described systems and methods provide advertising materials to one or more computer devices in an interaction in connection with one or more coordinating identifiers. Accordingly, in some such implementations, the described systems and methods are configured to generate revenue through advertising.

In yet other implementations, the described systems and methods are configured to allow an identifier to be used in place of a ticket (e.g., for entry to a movie, concert, game, play, meeting, meal, and/or other event). In some such implementations, the identifier (or ticket) assigned to a first computer device can be reassigned from the first computer device to any other suitable number of computer devices, such that the identifier (or ticket) could be "passed on".

While the methods and processes described herein can be particularly useful in the areas of transportation (e.g., allowing one or more drivers and one or more potential passengers to identify each other), courier services (e.g., allowing one or more senders and/or recipients to identify one or more couriers), event ticketing (e.g., where an identifier functions as one or more tickets), concessions (e.g., allowing one or more concession workers and one or more patrons to recognize each other), and queue management (e.g., alerting a party to an interaction when that parties turn has arrived and using a coordinating identifier to show that the turn has indeed arrived), those skilled in the art can appreciate that the described methods and processes can be used in a variety of different applications and in a variety of different areas of manufacture to help parties readily identify each other and/or for a number of other purposes.

By way of non-limiting example, some implementations of the described systems and methods can be used to help individuals identify and verify each other for home deliveries, dating (e.g., for blind dates, dates arranged through a website and/or dating app, etc.), classified add purchases (e.g., as users of Craig's List, Angie's List, the newspaper, and/or any other suitable forum to make a purchase, close a deal, and/or to provide/receive services), as parties meet to broker ticket sales (e.g., ticket resale brokering), airport pick up, appointments (e.g., with salesmen, repairmen, missionaries, recruiters, service providers, etc.), breaking groups of people into smaller groups, food delivery, and/or any other suitable circumstance in which at least one party wants to identify another party and/or location.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIGS. 2B-3 each illustrate a representative networked environment for use with some embodiments of the described systems and methods;

DETAILED DESCRIPTION OF THE INVENTION

Figure 1A:
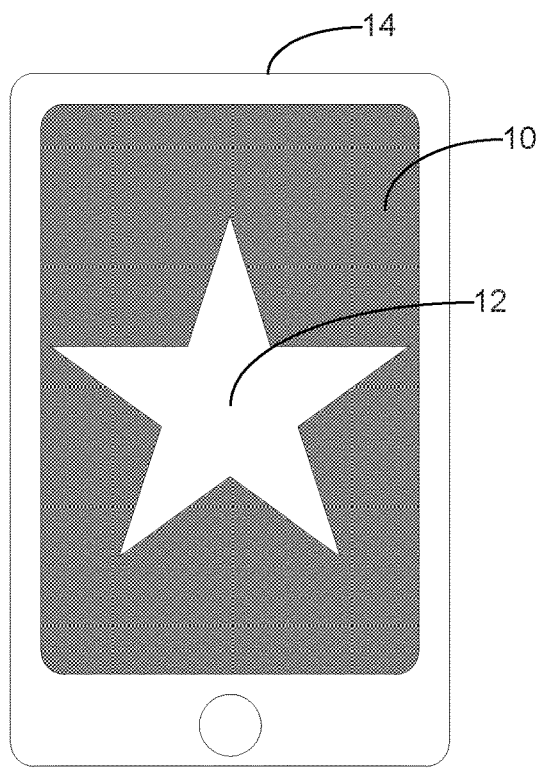
FIGS. 1A-1B illustrate face views of two separate wireless computer devices displaying coordinating identifiers in accordance with some embodiments of the described systems and methods.

Reference throughout this specification to "one embodiment," "an embodiment," "an implementation," or similar language means that a particular feature, structure, or characteristic described in connection with the embodiment or implementation is included in at least one embodiment of the present invention. Thus, appearances of the phrases "in one embodiment," "in an embodiment," "in another embodiment," "in some implementations," "in some other embodiments," "in some other implementations," and similar language throughout this specification may, but do not necessarily, all refer to the same embodiment.

Furthermore, the described features, structures, or characteristics of the described systems and methods may be combined in any suitable manner in one or more embodiments. In the following description, numerous specific details are provided, such as examples of suitable computer devices, computer systems, methods for identifying parties, methods for locating computer devices, etc., to provide a thorough understanding of embodiments of the invention. One having ordinary skill in the relevant art will recognize, however, that the described systems and methods may be practiced without one or more of the specific details, or with other systems, methods, techniques, components, materials, and so forth. In other instances, well-known systems, structures, materials, methods, or operations are not shown or described in detail to avoid obscuring aspects of the invention.

The present invention relates to systems and methods for identifying parties through the use of one or more corresponding, computer-coordinated identifiers. In particular, some embodiments of the present invention relate to systems and methods for using a server or other computer system to provide (wirelessly or otherwise) computer-coordinated perceptible identifiers (such as one or more images, light emissions, sounds, touch-perceptible identifiers, and/or other suitable identifiers) to two or more computer devices, with the identifiers received by each of the devices coordinating with each other to allow users of such devices to readily match the identifiers and to thereby identify each other. In some embodiments, the described systems and methods automatically ensure that coordinating identifiers received by computer devices participating in a first transaction do not coordinate with an identifier provided to another device participating in a second transaction when such other device is within a set proximity from one of more of the computer devices associated with the first transaction. Moreover, in some embodiments, the coordinating identifiers received by one or more of the computer devices participating in a transaction are configured to be modified when such devices come into proximity with each other and/or as otherwise desirable.

In the disclosure and in the claims the term identifier; identifiers; computer-coordinated identifier; corresponding, computer-coordinated identifier; perceptible identifier; matching identifier; and variations thereof may refer to one or more: visually perceptible symbols, shapes, patterns, images, icons, objects, drawings, photos, marks, words, letters, numbers, colors, color schemes, logos, trademarks, service marks, flashes, alternating colors, codes, advertisements, videos, audio/visual works, light emissions, combinations of the foregoing (e.g., multiple identifiers shown together; alternating colors, images, symbols, etc.; and/or any other suitable combination), and/or other visible material that can be shown on an electronic display or from an output that is in signal communication with an electronic device; audibly perceptible sounds, buzzes, beeps, ring tones, types of music, songs, words, statements, noises, patterns, combinations of the foregoing, and/or other audible sounds that can be produced by a computer device and/or an output that is in signal communication with the computer device; touch perceptible vibrations, forces, contacts, tactile notifications, cutaneous notifications, kinesthetic notifications, haptic notifications, combinations of the foregoing, and/or other touch perceptible actions that can be produced by a computer device and/or an output that is in signal communication with the computer device; other forms of stimulus that can be produced by a computer device and/or an output that is in signal communication with such device (and/or a server or other computer system); and/or combinations of the foregoing.

In some embodiments, the identifiers in an interaction or a transaction comprise a visually perceptible display (e.g., shown on the computer devices in the transaction) that match or otherwise coordinate with the other identifiers provided by the other computer devices in the transaction. Accordingly, in some such embodiments, parties can show the identifiers on their computer devices to each other to readily determine whether or not the other parties are part of the same transaction. By way of non-limiting illustration, FIGS. 1A-1D show some representative embodiments in which the identifiers 10 and 12 each comprises an image displaying a shape 12 (e.g., one or more stars, circles, triangles, squares, rectangles, octagons, polygons, irregular shapes, regular shapes, symmetrical shapes, asymmetrical shapes, character, mascot, symbol, one or more portions of a shape, a part of a puzzle, and/or any other suitable shape, portion of a shape, object, image, and/or light e-mission) with any suitable color scheme.

Figure 1B:
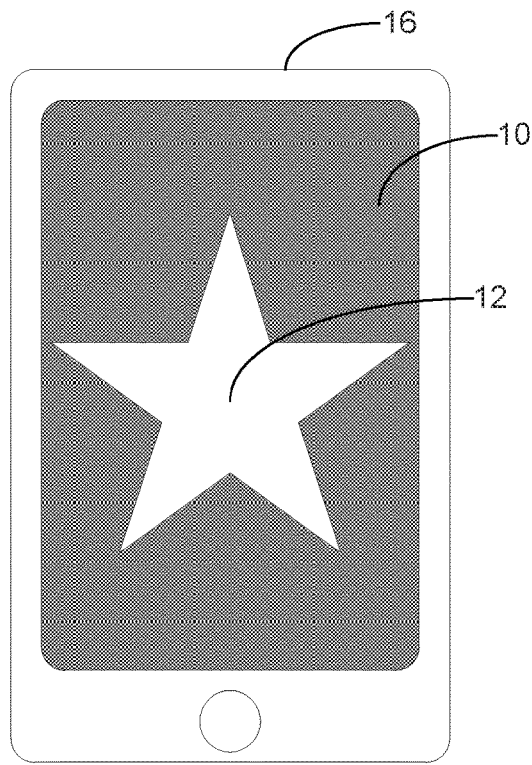
Figure 1C:
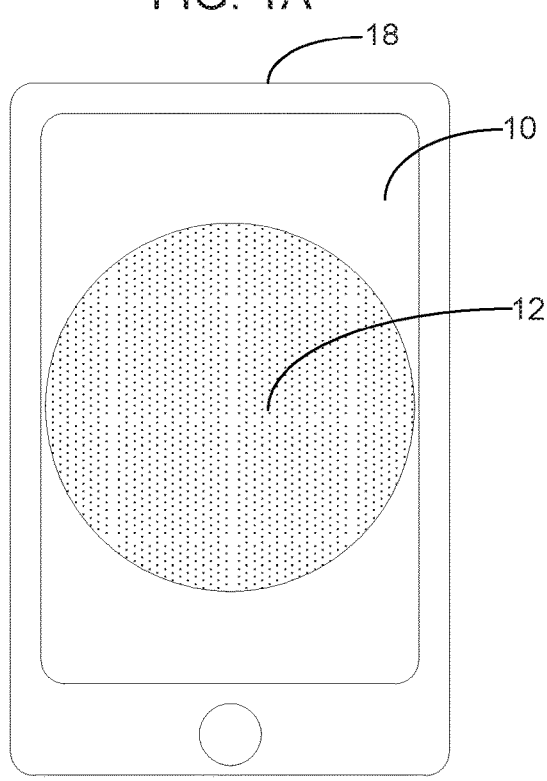
FIGS. 1C-1D illustrate face views of two separate computer devices displaying coordinating identifiers in accordance with some embodiments.
Figure 1D:
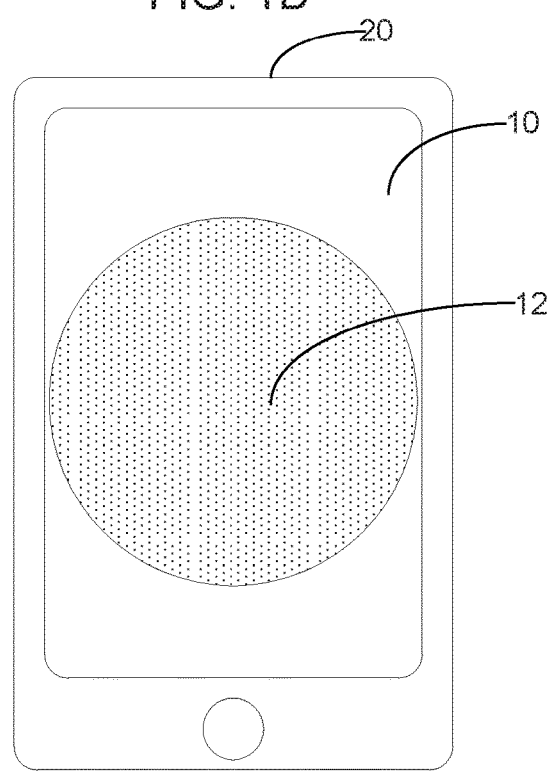

As used herein, the terms coordinate, coordinating, correspond, corresponding, match, and variations thereof may refer to a relation between two or more identifiers that allow such identifiers to: be exactly the same; be very similar to each other; be as close to the same as possible, accounting for variations in the functionality of the devices displaying and/or otherwise providing the identifiers; exactly match each other; substantially match each other; be mirror images of each other; be a positive and a negative image of each other; create a full image, word (e.g., "SHER" and "LOCK"), number, symbol, picture, image, and/or other identifier when used together; fit together (e.g., as portions of the same image, as puzzle pieces, a parts of the same song and/or sound, as matching images to be shown together, as coordinating images to be shown together, as different parts of the same song, and/or in any other suitable manner); complement each other (e.g., by having different identifiers that complement each other, such as by having one device display an image of a basketball and another device displaying an image of a basketball hoop (possibly with both images being shown together when the devices come into proximity with each other and/or at any other suitable time) and/or any other suitable complementary identifiers; have a sound and/or vibration that corresponds to a visual identifier (e.g., having one identifier comprise an audible version of a song, such as Jingle Bells, with the another coordinating identifier comprising an image corresponding to the song, such as an image of a jingle bell); having matching images that flash at the same and/or different times; and/or otherwise be readily identifiable as corresponding to (or otherwise matching) each other. Indeed, in some embodiments, coordinating identifiers comprise images that are substantially similar, if not exactly similar, to each other. By way of non-limiting illustration, FIGS. 1A and 1B show some embodiments in which two separate wireless computer devices 14 and 16 each show coordinating identifiers 10 that are readily matched with each other, and distinguished from other identifiers (e.g., those identifiers shown on the computer devices 18 and 20 of FIGS. 1C and 1D).

As used herein, the terms interaction, interactions, transaction, transactions, and variations thereof may, in some cases, be used interchangeably, and may refer to a session, communication, process, and/or other interaction between a remote computer system (e.g., a server or other computer system) and/or two or more computer devices (e.g., desktop computers; wireless computer devices, such as phones, tablets, laptops, etc.; and/or other suitable computer devices), wherein as part of the transaction the two or more computer devices each receive one or more identifiers that coordinate with each other (e.g., such that parties associated with the computer devices can compare identifiers and readily identify each other (e.g., as being part of the same transaction)).

The following disclosure of the described systems and methods is grouped into two subheadings, namely "Representative Operating Environment" and "Methods." Utilization of the subheadings is for convenience of the reader only and is not to be construed as limiting in any sense.

Representative Operating Environment

The described systems and methods can be used with any suitable operating environment and/or software. In this regard, FIG. 2A and the corresponding discussion are intended to provide a general description of a suitable operating environment in accordance with some embodiments of the described systems and methods. As will be further discussed below, some embodiments embrace the use of one or more processing units in a variety of customizable enterprise configurations, including in a networked or combination configuration, which may also include a cloud-based service, such as a platform as a service, software as a service, and/or as any other suitable service.

Some embodiments of the described systems and methods embrace one or more computer readable media, wherein each medium may be configured to include or includes thereon data (non-transitory or transitory) or computer executable instructions for manipulating data. The computer executable instructions include data structures, objects, programs, routines, and/or other program modules that may be accessed by one or more processors, such as one associated with a general-purpose modular processing unit capable of performing various different functions and/or one associated with a special-purpose modular processing unit capable of performing a limited number of, and/or specific, functions.

Computer executable instructions cause the one or more processors of the one or more enterprises to perform a particular function or group of functions and are examples of program code means for implementing steps for methods of processing. Furthermore, a particular sequence of the executable instructions provides an example of corresponding acts that may be used to implement such steps.

Examples of computer readable media (including, without limitation, non-transitory computer readable media) include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), any solid state storage device (e.g., flash memory, smart media, etc.), and/or any other device or component that is capable of providing data and/or executable instructions that may be accessed by a processing unit.

Figure 2A:
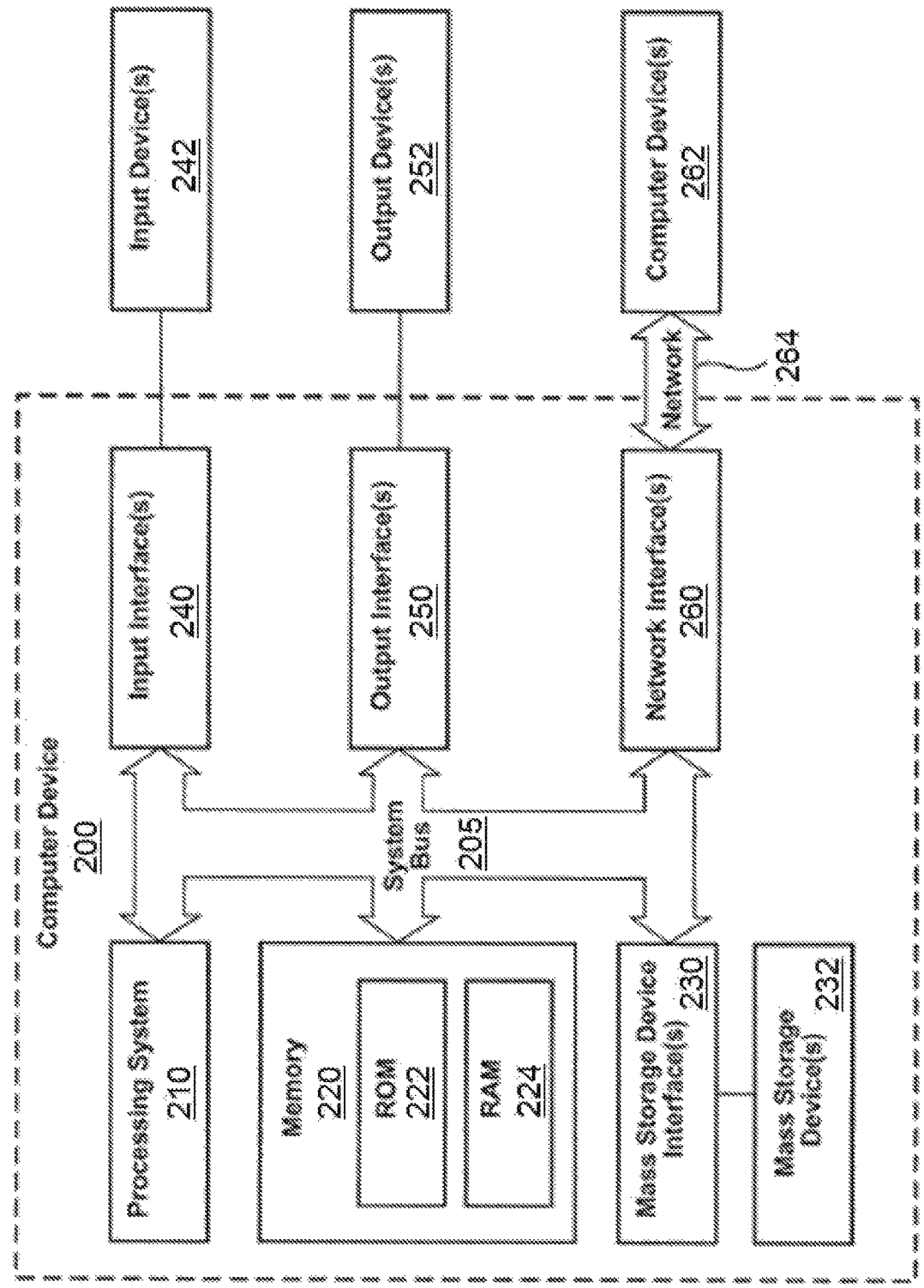
FIG. 2A illustrates a representative system that provides a suitable operating environment for use with some embodiments of the described systems and methods.

With reference to FIG. 2A, a representative enterprise includes modular processing unit 200 (e.g., a computer system, a wireless computer device, and/or other computer device), which may be used as a general-purpose or a special-purpose processing unit. For example, modular processing unit (or computer device) 200 may be employed alone or with one or more similar modular processing units as a smart phone, a cellular phone, a feature phone, a tablet computer, a smart television, a mobile computer device, a personal computer, a notebook computer, a PDA or other hand-held device, a workstation, a minicomputer, a mainframe, a supercomputer, a multi-processor system, a network computer, a processor-based consumer device, a smart appliance or device, a control system, and/or the like. Indeed, in some embodiments, the modular processing unit comprises at least one of a server and a computer device (including, without limitation, a wireless computer device). Using multiple processing units in the same enterprise provides increased processing capabilities. For example, each processing unit of an enterprise can be dedicated to a particular task or can jointly participate in distributed processing.

In FIG. 2A, the modular processing unit 200 (e.g., a computer system and/or computer device) includes one or more buses and/or interconnects 205, which may be configured to connect various components thereof and enables data to be exchanged between two or more components. The bus(es)/interconnect(s) 205 may include one of a variety of bus structures, including, without limitation, a memory bus, a peripheral bus, and/or a local bus that uses any of a variety of bus architectures. Typical components connected by the bus(es)/interconnect(s) 205 include one or more processors 210 and one or more memories 220. Some other non-limiting components that may be selectively connected to the bus(es)/interconnect(s) 205 through the use of logic, one or more systems, and one or more subsystems, include one or more mass storage device interfaces 230, input interfaces 240, output interfaces 250, and/or network interfaces 260, each of which will be discussed below.

In some embodiments, the processing system 210 includes one or more processors, such as a central processor, a microprocessor, and optionally one or more other processors designed to perform a particular function or task. It is typically the processing system 210 (also referred to as a processor or computer processor) that executes the instructions provided on computer readable media, such as on the memory 220, a magnetic hard disk, a removable magnetic disk, a magnetic cassette, an optical disk, and/or from a communication connection, which may also be viewed as a computer readable medium.

In accordance with some embodiments, the memory 220 includes one or more computer readable media (including, without limitation, non-transitory computer readable media) that may be configured to include or includes thereon data or instructions for manipulating data, and may be accessed by the processing system 210 through the system bus 205. The memory 220 may include, for example, ROM 222 used to permanently store information, and/or RAM 224 used to temporarily store information. In some embodiments, ROM 222 includes a basic input/output system ("BIOS") having one or more routines that are used to establish communication, such as during start-up of computer device 200. In some embodiments, RAM 224 includes one or more program modules, such as one or more operating systems, application programs, and/or program data.

One or more mass storage device interfaces 230 may be used to connect one or more mass storage devices 232 to the system bus 205. The mass storage devices 232 may be incorporated into and/or may be peripheral to the computer device 200 and allow the computer device (and/or computer system) 200 to retain large amounts of data. Optionally, one or more of the mass storage devices 232 may be removable from computer device 200. Examples of mass storage devices include hard disk drives, magnetic disk drives, tape drives, solid state mass storage, and/or optical disk drives.

Some non-limiting examples of solid state mass storage include flash cards and memory sticks. The mass storage device 232 may read from and/or write to a magnetic hard disk, a removable magnetic disk, a magnetic cassette, an optical disk, or another computer readable medium. The mass storage devices 232 and their corresponding computer readable media provide nonvolatile storage of data and/or executable instructions that may include one or more program modules, such as an operating system, one or more application programs (or applications), other program modules, or program data. Such executable instructions are examples of program code means for implementing steps for methods disclosed herein.

One or more input interfaces 240 may be employed to enable a user to enter data (e.g., initial information) and/or instructions to computer device (or computer system) 200 through one or more corresponding input devices 242. Examples of such input devices include a keyboard and/or alternate input devices, such as a digital camera, a sensor, bar code scanner, debit/credit card reader, signature and/or writing capture device, pin pad, touch screen, mouse, trackball, light pen, stylus or other pointing device, a microphone, a joystick, a game pad, a scanner, a camcorder, and/or other input devices. Similarly, examples of input interfaces 240 that may be used to connect the input devices 242 to the system bus 205 include a serial port, a parallel port, a game port, a universal serial bus ("USB"), a firewire (IEEE 1394), a wireless receiver, a video adapter, an audio adapter, a parallel port, a wireless transmitter, and/or another interface.

One or more output interfaces 250 may be employed to connect one or more corresponding output devices 252 to the system bus 205. Examples of output devices include one or more monitors, projectors, display screens, speakers, lights, wireless transmitters, printers, and the like. A particular output device 252 may be integrated with or peripheral to computer device 200. Examples of output interfaces include a video adapter, an audio adapter, a parallel port, and the like.

One or more network interfaces 260 enable computer device (or computer system) 200 to exchange information with one or more local or remote computer devices, illustrated as computer devices 262, via a network 264 that may include one or more hardwired and/or wireless links. Examples of the network interfaces include a network adapter for connection to a local area network ("LAN") or a modem, a wireless link, an infrared link, a BLUETOOTH® link, and/or another adapter for connection to a wide area network ("WAN"), such as the Internet. The network interface 260 may be incorporated with or be peripheral to computer device 200.

Figure 2B:
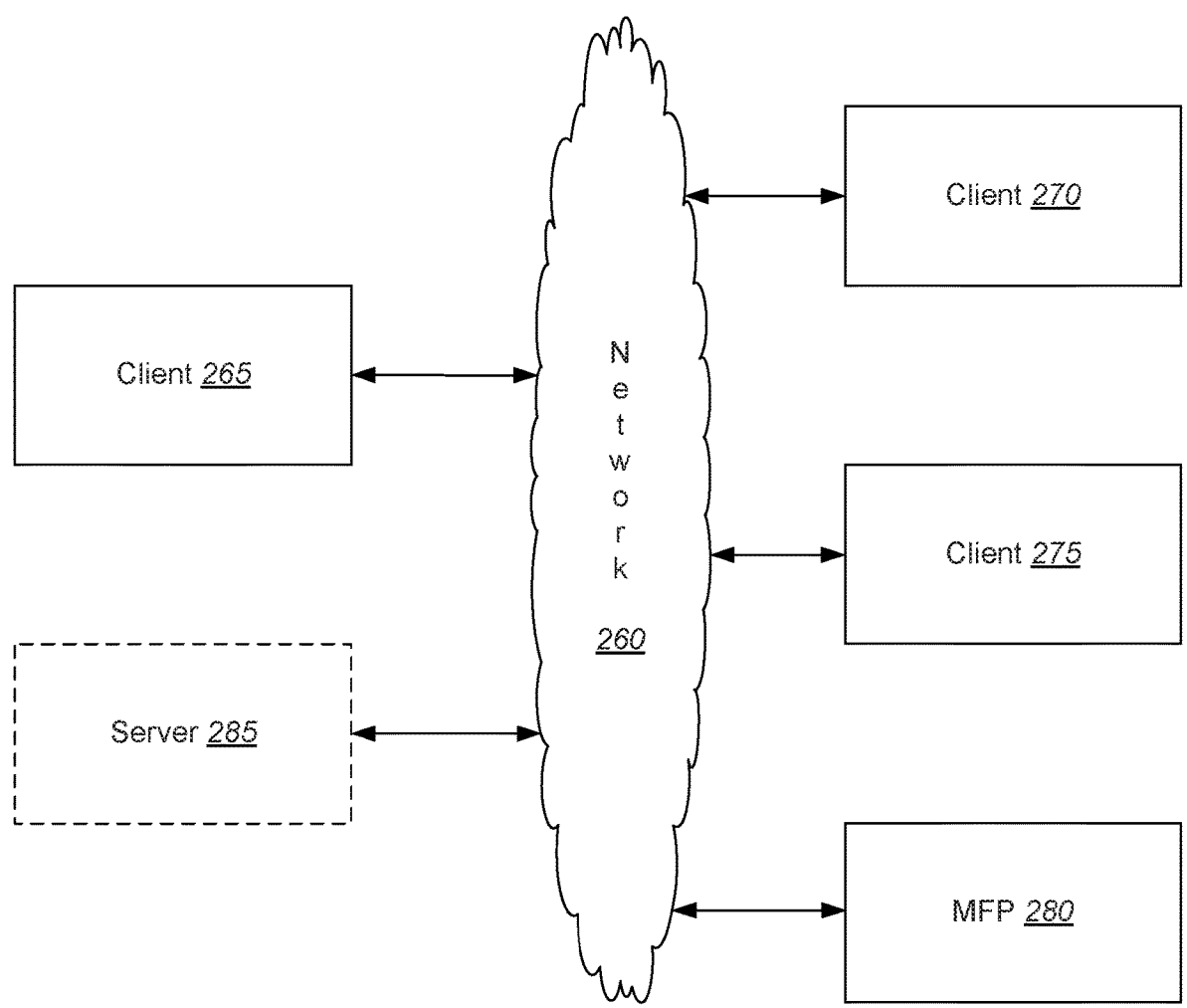

In a networked system, accessible program modules or portions thereof may be stored in a remote memory storage device. Furthermore, in a networked system computer device 200 may participate in a distributed computing environment, where functions or tasks are performed by a plurality networked computer devices. While those skilled in the art will appreciate that the described systems and methods may be practiced in networked computing environments with many types of computer system configurations, FIG. 2B represents an embodiment of a portion of the described systems in a networked environment that includes clients (or computer devices 265, 270, 275, etc.) and/or and one or more peripheral devices (illustrated as multifunctional peripheral (MFP) MFP 280) connected to a server 285 via a network 260. While FIG. 2B illustrates an embodiment that includes three clients (e.g., computer devices, such as smart phones and/or other wireless computing devices) connected to the network (and one or more servers 285), alternative embodiments include at least one client connected to a network or many (e.g., 2, 4, 5, 6, 7, 8, and or any other suitable number of) clients connected to a network and/or one or more servers.

Figure 3:
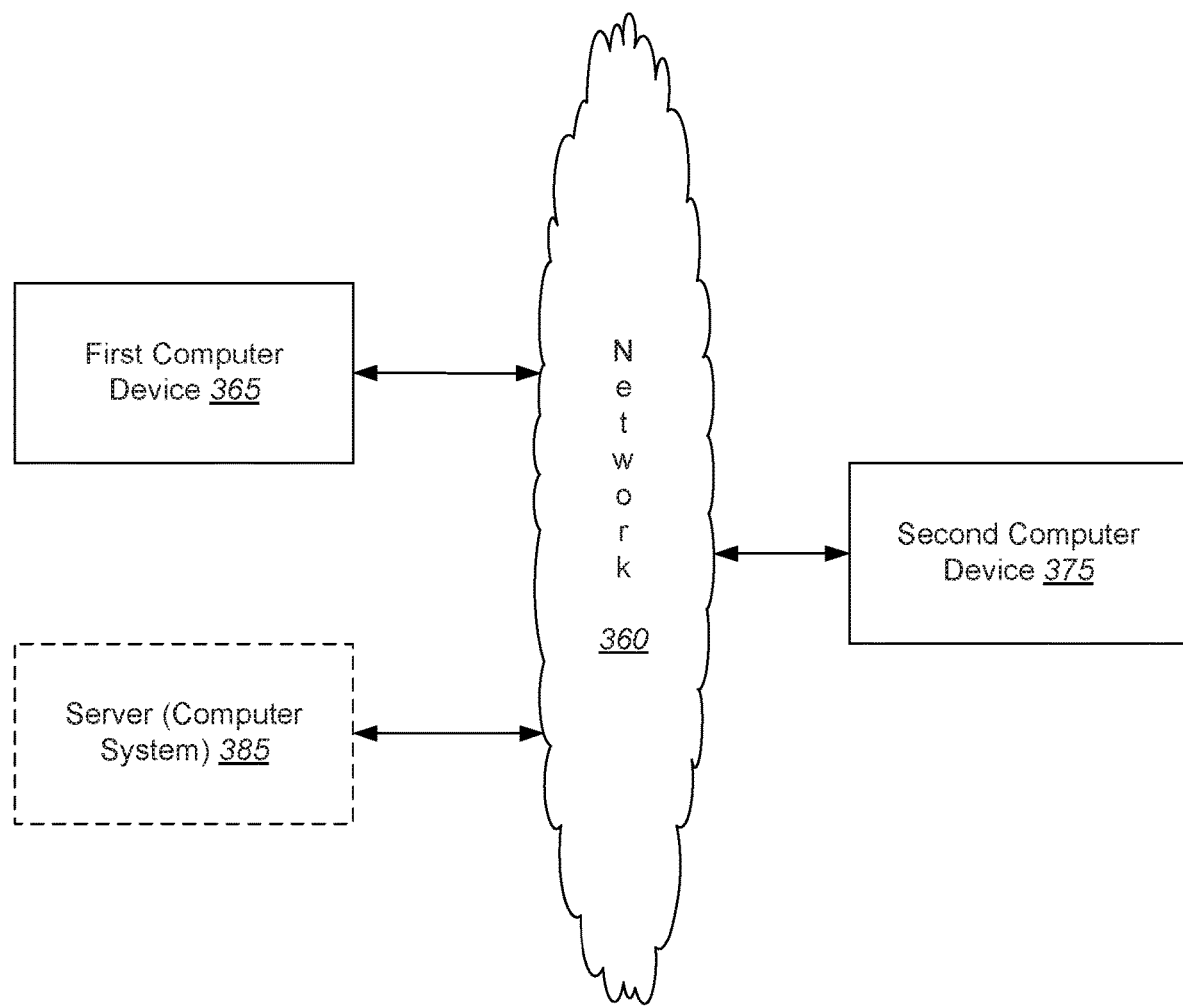

In one non-limiting illustration of a basic view of the described systems, FIG. 3 shows that, in some embodiments, the system comprises two or more computer devices (e.g., 365 and 375) that are connected to a server (or other computer system) 385 through a network (e.g., the Internet and/or any other suitable server). While the computer devices can comprise any suitable computer device (e.g., as described above), including, without limitation, a display comprising (or otherwise in signal communication with a device comprising a) processing unit (e.g., a smart display, a smart TV, etc.), a smart phone, a cell phone, a tablet, a laptop, a desktop computer, and/or any other suitable computer device, in some embodiments, the first computer device comprises a smart phone and the second computer device comprises smart phone and/or a smart display. In some other embodiments, however, at least one computer device (e.g., a first computer device 365) in a transaction comprises a wireless computer device (e.g., a smart phone, cell phone, tablet, laptop, etc.) while at least one other computer device in the transaction (e.g., a second computer device 375) comprises a computer device that is in signal communication with a display (e.g., TV, monitor, projector, screen, and/or other display).

Methods

Figure 4:
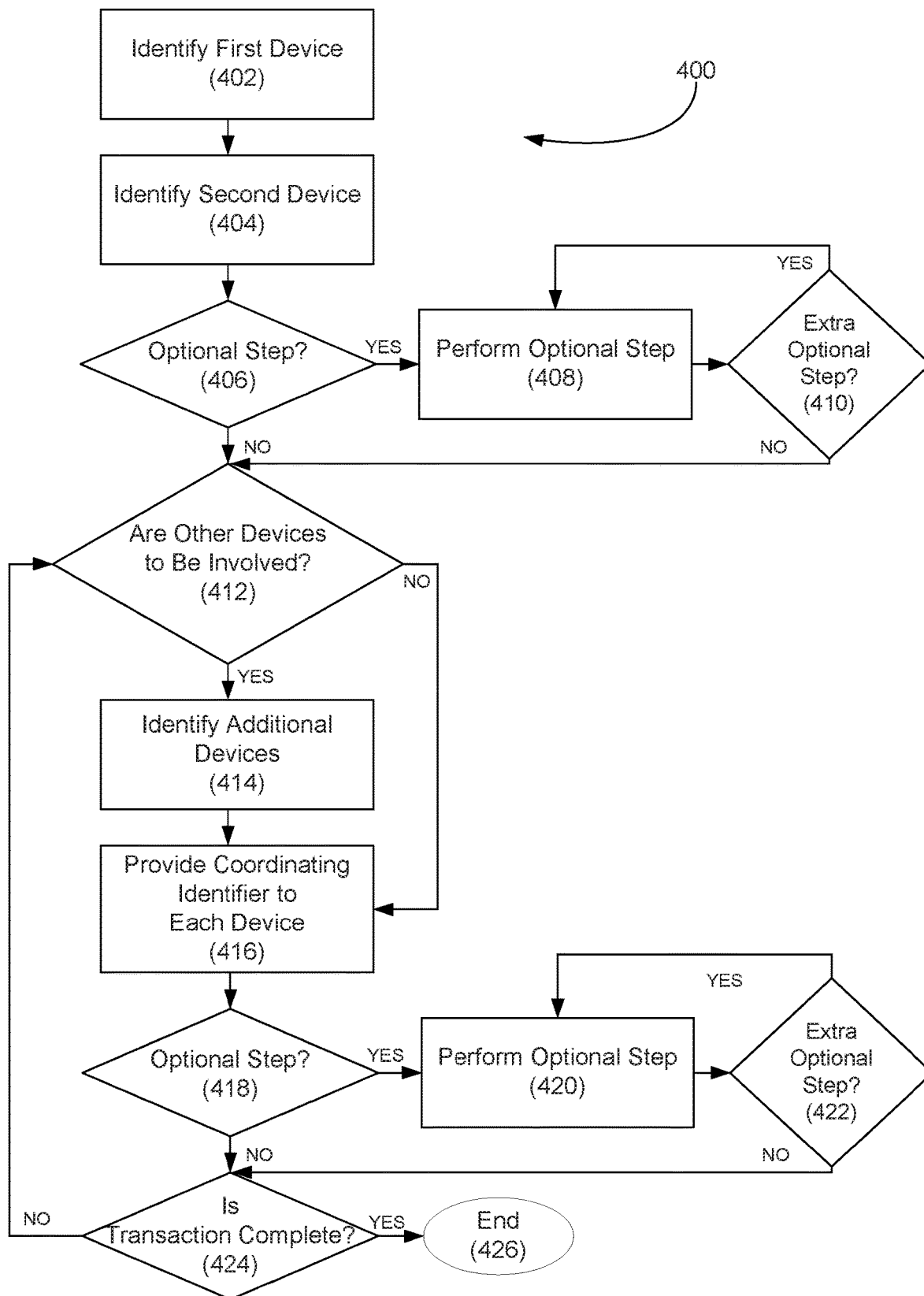
FIG. 4 illustrates a server-centric flowchart showing a representative embodiment of a method for identifying parties by providing such parties with coordinating identifiers.
Figure 5:
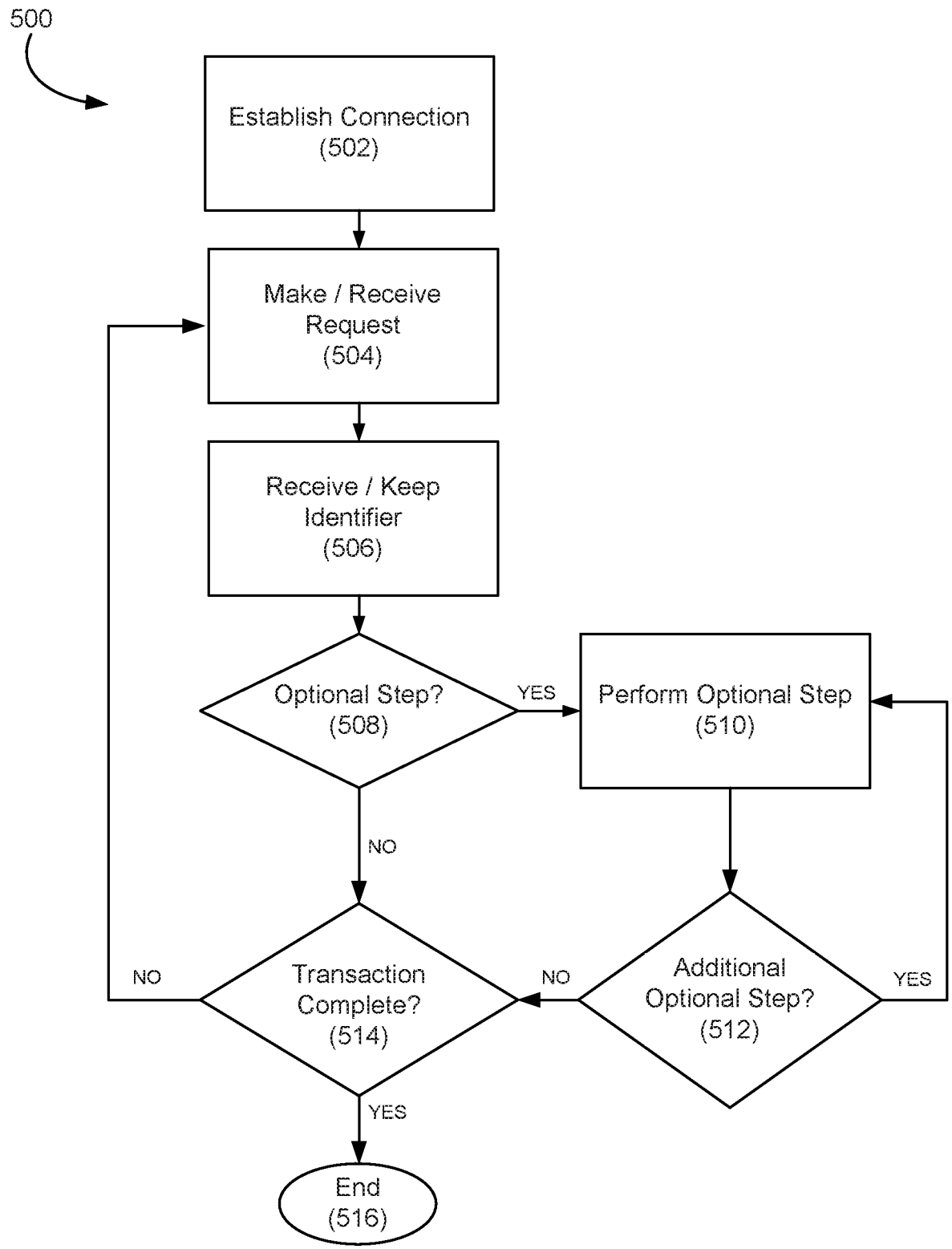
FIG. 5 illustrates a client- (or computer device) centric flowchart showing a representative embodiment of a method for identifying parties by providing such parties with coordinating identifiers.

While the described systems and methods can be implemented in any suitable manner, FIGS. 4 and 5 show some non-limiting examples of suitable methods for using computer-coordinated identifiers to identify separate parties. In particular, FIG. 4 illustrates a representative method for helping two or more parties to identify each other, from the prospective of a server (or other computer system), while FIG. 5 illustrates a representative method for helping two or more parties to identify each other, from the prospective of one or more of the parties (e.g., via the parties' respective computer devices). In this regard, it should be noted that each of these methods (as well as all other methods described herein) can be modified in any suitable manner. For instance, any suitable step can be added to, be removed from, be modified, be reordered within, and any additional step can be added to, each of the described methods. It should also be noted, that while the term step is used herein, that term may be used to simply draw attention to different portions of the described methods and is not meant to delineate a starting point or a stopping point for any portion of the methods, or to be limiting in any other way.

With reference now to FIG. 4, that figure shows that, in some embodiments, the method 400 begins at steps 402 and 404 by identifying two or more parties that are using the described systems and methods to meet and identify each other. In this regard, a computer system (e.g., server 385) and/or one or more parties can select and/or otherwise identify the various parties to a transaction in any suitable manner, including, without limitation, by providing an application (e.g., a mobile app, a website, an online app, a software application, etc.) that provides the described systems and methods and allows one or more parties to use such application to enter into a transaction with one or more parties; by allowing one party to a transaction to select a specific party for participation in that transaction, by determining who is logged into the system, by determining who has made a request and who can fill the request, by determining who has made an offer and who is willing to accept the offer, by determining who (or whose phone or other computer device) is in the closest proximity to a particular person (or that person's phone or computer device), and/or in any other suitable manner.

In one non-limiting example, a first party uses his or her computer device (e.g., a wireless device and/or otherwise) to access an application that functions in accordance with at least some embodiments of the described systems and methods. In this example, the first party is able to use the application (and/or any other suitable means of communication, including, without limitation, a phone, fax, email, etc.) to request a good or service (e.g., a car ride), and another party is able (e.g., through use of the application and/or any other suitable communication channel) to use his or her computer device to indicate that he or she can provide the requested good or service to the first party (e.g., that he or she is willing to provide a car ride). Additionally, in this example, the computer system (e.g., server 385), one of the two computer devices, and/or any other suitable system determines, logs, and/or otherwise records that the first and the second party are part of the same transaction.

In accordance with some embodiments, FIG. 4 shows at step 406 the described method involves determining whether the described systems will conduct one or more additional optional steps (as discussed below) before proceeding. If the system recognizes that one or more optional steps will be completed, FIG. 4 shows the optional step is completed at step 408, and the described systems determine whether any additional optional steps will be completed (e.g., as shown at step 410. Once the described systems have determined that no optional steps will be completed at this time (and/or that all optional steps have been completed), FIG. 4 shows that the method 400 includes a step for determining (e.g., at step 412) whether or not an additional party is to be added to the transaction.

In this regard, while steps 402 and 404 of FIG. 4 shows some embodiments in which the described method 400 helps two parties to identify each other, step 412 in that figure shows that, in some embodiments, the described systems check, are told, and/or otherwise determine whether any additional parties are to be part of the transaction. For instance, the described systems may check to see whether multiple people want to share (or receive) a car ride (or other good or service).

If the system determines at step 412 that one or more additional parties (e.g., computer devices 365, 375, etc.) are to be involved in the transaction, the system identifies (e.g., as shown at step 414) the additional party (and/or the additional party's smart phone or other suitable computer device) and logs that party (and/or the corresponding computer device) as being part of the transaction.

In some embodiments, once the system (e.g., the server 385 and/or one or more computer devices 365, 375, etc.) determines that two or more parties (or computer devices) will be part of a transaction (e.g., by determining at 412 that no (or one or more) additional parties will participate in the transaction), FIG. 4, at step 416, shows that, in some embodiments, the method 400 continues as the computer system (e.g., server 385) (and/or any other suitable computer device) provides the first computer device 365, the second computer device 375, and/or any other suitable computer device participating in the transaction with coordinating identifiers.

In this regard, the computer system (e.g., server 385) and/or any other suitable computer device can provide the first and second (and/or any other) computer devices in the same transaction with coordinating identifiers in any suitable manner. Indeed, in some embodiments, one party is allowed to select an identifier and the system provides that identifier (and/or one or more other coordinating identifiers) to the other party or parties in the transaction. In another example, the system is told which identifier to use, and/or otherwise selects an identifier and sends that identifier and/or another coordinating identifier (and/or a code, number, signal, and/or other information indicating which identifier to produce) to the applicable computer device and/or devices.

FIG. 4 shows that, in some embodiments, the method 400 continues at step 418 (much as shown at step 406) where the described systems (and/or one or more users) determine whether the system will conduct one or more additional steps (as discussed below). If the system recognizes that one or more optional steps will be completed, FIG. 4 shows the optional step is completed at step 420, and the systems determine whether any additional optional steps will be completed (e.g., as shown at step 422). Once the systems have determined that no optional steps will be completed (or that all optional steps have been completed), FIG. 4 shows that the computer system determines (e.g., at step 424) whether or not the transaction is complete. In some embodiments, if the transaction is not complete, the system returns to step 412 in the method 400 and continues on until it is complete. That said, if the system determines that the transaction is complete (e.g., the applicable parties have identified each other and/or a portion of the transaction is otherwise completed), FIG. 4 shows the method ends (e.g., at step 426), such that the method can be repeated.

Where the described systems (e.g., the computer system or server 385; one or more computer devices 365, 375, etc.;

and/or any other suitable portion of the overall described system) determine that a transaction is complete and that the intended parties have properly identified each other, the described systems can make that determination in any suitable manner. By way of non-limiting example, some embodiments of the described systems and methods determine that a transaction is complete when one or more users of the computer devices that provide the coordinating identifiers (e.g., the first device 365 and/or the second device 375) in a transaction indicates that the transaction is cancelled or otherwise complete (e.g., by such user tapping the identifier on his/her computer device (e.g., on a device with a touch screen), by providing a command to terminate the transaction, by closing of an app and/or website used to initiate the transaction, by providing a signature (e.g., via a touch screen and/or other input), by turning off of one or more computer devices in the transaction, by sending a text, by sending an e-mail, and/or in any other suitable manner).

In another example, the described systems and methods are configured to determine that a transaction (or at least a portion of a transaction) is complete when one or more barcodes, QR codes, RF signals, near field communication signals, infrared signals, BLUETOOTH® signals, radio signals, and/or other information provided by one or more (e.g., all) of the devices (e.g., device 365, 375, etc.) in the transaction are registered (e.g., scanned, picked up, received, etc.) by one or more (e.g., all) of the other devices in the transaction.

In still another example, the described systems and methods determine that a transaction is complete when the computer devices (e.g., devices 365, 375, etc.) that are identified as being part of a transaction are determined (e.g., via the GPS coordinates of the devices, multilateration of the devices, localization of the devices, information provided by one or more users of the devices (e.g., a current address, location, and/or other suitable information), and/or any other suitable method) to be within any suitable set distance from each other (e.g., for any suitable time).

In yet another example, the described systems and methods are configured to determine that a transaction is complete and/or reached a certain point when a camera, sensor, and/or software operating on or through one or more (e.g., all) of the devices identified as pertaining to a transaction recognizes and/or otherwise identifies (via facial recognition, object recognition, scanning, near field communications, IR communications, and/or otherwise) a face, car, license plate, code, sound, signal, and/or other object and/or identifier that is entered into the system as pertaining to one of the other parties in the transaction.

In one non-limiting example, one or more devices in a transaction provides one or more QR codes, bar codes, numeric codes, sounds, markings, codes, IR signals, BLUETOOTH® signals, near field signals, and/or any other suitable and recognizable marking and/or other identifier. In some such cases, as two or more devices in a transaction come near each other (e.g., screen to screen and/or otherwise), one or more of the devices can scan the other device (e.g., via a camera, scanner, IR receiver, BLUETOOTH® receiver, Wi-Fi receiver, near field receiver, sensor, and/or in any other suitable manner) to recognize whether or not that device comprises a marking or other identifier showing that such device pertains to the desired transaction. In some instances, when one or more devices in a transaction identify another device (and/or a person and/or other object associated with such device) in the transaction, one or more such devices modify their coordinating identifiers (e.g., by making a noise, playing a song, modifying one or more images on the devices, posting a message, flashing, and/or in any other suitable manner).

Accordingly, in some embodiments, in addition to (and/or in place of) recognizing parties by having users match coordinating identifiers, in some embodiments, the described systems and methods are configured to have one or more computer devices in a transaction determine that the proper parties have met. Similarly, in some embodiments, when one or more devices determines that another device (and/or person and/or object) is not part of a transaction (e.g., via scanning, receiving a signal, comparing identifiers, optical recognition, and/or in any other suitable manner), such devices may alert their users of the finding (e.g., by making a noise, providing a message, and/or in any other suitable manner).

In still another non-limiting example, some embodiments of the described systems and methods determine that a transaction is complete when one or more computer devices (e.g., 365, 375, etc.) identified in a transaction receives a signature, fingerprint, retinal scan, biometric scan, and/or other similar indicator from one or more other parties to the transaction.

Turning now to FIG. 5, that figure (as mentioned above) shows a representative embodiment similar to the method 400 of FIG. 4, but shown from the perspective of a party (e.g., the party's computer device) to a transaction. In particular, that figure shows that, in accordance with some embodiments, the method 500 (or a transaction) begins at step 502 as a first computer device 365 (e.g., a laptop, wireless phone, tablet, etc.) makes a connection with the server 385. This connection can be made in any suitable manner, including, without limitation, by: logging into an account, setting up an account, opening an app (e.g., a mobile app, an online app, a website, one or more pieces of application software, and/or any other suitable application) that accesses the server, turning on the first computer device, making a request through the server (e.g., for a good and/or service), making a request and/or offering a service via text, email, fax, and/or any other suitable method, and/or otherwise connecting to the server. Indeed, in some embodiments, the first computer device establishes a connection with the server when a user opens an app on the first computer device and/or makes a request or an offer through that device.

FIG. 5 shows that, in some embodiments, the method 500 continues at step 504 as the user of the first device 365 makes a request and/or receives a request through the first device. Where the user makes a request, the user can make any suitable request (depending on the circumstances and the functionality of the first device). By way of non-limiting example, the user may request and/or receive a request: for one or more rides (e.g., to get and/or give a ride via an UBER® vehicle, a LYFT® vehicle, a taxi, a bike taxi, and/or in any other suitable manner), meetings, visits, appointments, dates, bids, products (e.g., one or more concessions, groceries, items, tickets, and/or virtually any other goods), services (e.g., one or more deliveries, repairs, massages, consultations, and/or virtually any other services); and/or other suitable item or service; to be divided into groups; to be sent to a location; to escort a minor; to enter a queue; and/or the user may ask for, offer, and/or otherwise make or receive any suitable request.

Continuing with FIG. 5, that figure shows that, in some embodiments, the method 500 continues at step 506 as the first device (e.g., device 365) receives an identifier (e.g., an identifier that coordinates with an identifier provided to one or more other computer devices (e.g., the second computer device) of users who have agreed to the request or otherwise been assigned to the transaction with the first device.

FIG. 5 shows that, in some embodiments, the method 500 further includes determining whether one or more additional optional steps (as discussed below) are to be performed before the transaction is complete. If there are additional steps to be performed, the method continues to steps 510 and 512. If there are no additional steps to be performed (and/or if the additional steps are complete), the method continues to step 514, where the system (e.g., the first computer device 365, the second computer device 375, the server 385, and/or any other suitable portion of the overall system) determines whether the transaction (and/or a portion thereof) is complete (e.g., whether the parties with coordinating identifiers on (or provided by) their various computer devices were actually able to meet each other). If the transaction is not deemed complete, the method can continue in any suitable manner, including, without limitation, by returning to step 504 (and/or any other suitable portion of the method). That said, if the system determines that the transaction is complete (e.g., the applicable parties have identified each other), FIG. 5 shows the method 500 ends (e.g., as shown at step 516), such that the method can be repeated and/or otherwise be restarted.

As mentioned, the described methods (e.g., methods 400 and 500, as well as all other methods described herein) can be modified in any suitable manner. In this regard, while FIGS. 4 and 5 show that, in some embodiments, the described systems and methods include providing one or more additional steps before and/or after the parties in a transaction have received coordinating identifiers, such additional steps can take place at absolutely any suitable time or times in the methods. Moreover, such additional steps can include any suitable step that allows the described systems and methods to help parties identify each other (and/or a desired good, service, object, and/or location).

As an example of an optional step, some embodiments of the described systems and methods are configured to randomly pick the coordinating identifiers (e.g., to pick matching symbols with matching color schemes) that are provided to each of the computer devices in a transaction from one or more databases. In some other embodiments, however, the described systems and methods are configured to select the coordinating identifiers based on one or more preferences, demographics, and/or other information provided by and/or otherwise relating to one or more parties to the transaction.

Indeed, in some embodiments, the described methods involve the additional step of allowing one or more users to input preferences and/or other information (e.g., demographic information and/or any other suitable information) and/or of allowing the system to otherwise gain information about the user and/or the user's device. In this regard, the users (or parties to one or more transactions) can input (and the system can otherwise obtain) any suitable preferences and/or information about a particular user (and/or the user's device), including, without limitation, the user's favorite colors; color schemes from a favorite team of the user; whether or not the user is color blind and should thereby be prevented from receiving identifiers with certain colors/color schemes that would be difficult to see; whether the user is blind and should receive audio and/or haptic identifiers; the user's preferred symbols; the user's desired identifier genres; the user's desired symbols; the users desired characters; the user's desired font; the location of the user's device; and/or any other suitable preference and/or other information. Additionally, in some embodiments, the described systems and methods allow users to provide (and/or the system to otherwise obtain) information about their age, gender, ethnicity, wage, Internet browsing history, and/or any other suitable information that may be useful in personalizing identifiers to such users and/or a transaction.

In some embodiments in which the described systems and methods allow users to enter (and/or that otherwise allow the system to obtain) preferences and/or other information useful for identifier selection, the described systems and methods can select coordinating identifiers for all parties to an interaction based on the preferences and/or information obtained from any number of parties to the transaction. In some embodiments, however, the described systems provide identifiers to all parties to a transaction based on the preferences of one party to the transaction (e.g., a patron, the purchase, the passenger, and/or any other suitable party).

In some embodiments, the described systems and methods include, as part of the process for selecting identifiers, an additional step of checking conditions (e.g., light, weather, time of day, and/or any other condition) associated with one or more computer devices in a transaction (e.g., computer devices 365 and 375), and then selecting and/or modifying the coordinating identifiers based on such conditions. By way of non-limiting example, where any portion of the described systems determines that a computer device is in a place with snow, the system can determine to use a dark identifier, as opposed to a white identifier. In another example, if the system determines that a computer device participating in a transaction is in a place with a lot of light, the system will automatically modify/change the coordinating identifiers to help them be readily visible.

Where the described systems and methods are configured check one or more conditions associated with one or more computer devices (e.g., the first 365 and/or second 375 devices) in a transaction in order to select and/or modify an identifier, the system may check such conditions in any suitable manner, including, without limitation, by checking the time of day as recorded by the computer system (e.g., server 385), any applicable computer devices (e.g., the first 365 and/or second 375 devices), and/or any other suitable source; by checking weather, and/or light locations (e.g., via one or more weather apps, websites, RSS feeds, news websites, and/or other suitable sources) based upon a location of one or more computer devices associated with a transaction; and/or in any other suitable manner.

In another example of a method used to select identifiers for a transaction, some embodiments of the described systems and methods are configured to check a location (e.g., via GPS coordinates, multilateration, localization, information provided by a user, and/or any other suitable method) of one or more computer devices (e.g., the first 365 and/or second 375 devices) in a transaction and to provide corresponding identifiers that relate to a location, an intended location, an event (e.g., a sporting event, a play, a parade, a concert, a venue, and/or any other suitable event), a landmark, a tourist attraction, a school, a school mascot, a flag, a business, and/or any other suitable place and/or event that is en route, at a beginning location of, at a final location, and/or that otherwise associated with a party to a transaction. For instance, if some embodiments of the system determine that a potential passenger is just exiting (or even near) an event (e.g., a football game), the system provides that passenger and any other party to the transaction (e.g., the driver) with an identifier relating to that event (e.g., a symbol of a football helmet, a football, a goal post, a player number, a jersey, a team color, a team mascot, and/or any other suitable identifier relating to the event). In another example, as the described systems and methods are used to determine that a party to a transaction is visiting an establishment (e.g., Starbucks and/or any other establishment), the described systems and methods may provide one or more parties to the transaction with an identifier comprising a logo, trademark, service mark, color scheme, and/or other identifier of that establishment.

In another example of a suitable optional step, in some embodiments, the described systems and methods are configured to automatically modify (e.g., change; flash; blink; beep; make a sound; play music; display a message (e.g., "Your car has arrived", "Your table is ready", etc.); combine identifiers (e.g. by placing matching portions of an image together, by associating complementary identifiers with each other (e.g., by showing a first identifier comprising a basketball go through a second, hoop-shaped identifier or otherwise), and/or to otherwise combine identifiers); alternate with other identifiers, and/or to otherwise modify the coordinating identifier provided to one or more of the computer devices (e.g., the first 365, second 375, and/or all other devices) involved in a transaction. In this regard, identifiers can be caused to be modified at any suitable time, including, without limitation, as one or more of the computer devices (e.g., wireless devices or otherwise) in a transaction come into proximity with each other, a turn in a queue of a party to the transaction approaches and/or arrives, after two or more computer devices participating in the same transaction have been in proximity to each other for a set period of time, and/or at any other suitable time.

Although in some embodiments, the described systems may only cause the coordinating identifiers to be modified once the applicable computer devices (e.g., a first and a second smart phone) are within a set distance from each other, in some other embodiments, the coordinating identifiers are configured to be modified multiple times as two or more computer devices of a transaction come closer together. By way of non-limiting example, in some embodiments in which a first device 365 in a transaction is held by a car driver and a second device 375 is held by a potential passenger, the passenger's and/or the driver's device may begin to flash their coordinating visual identifiers; brighten, focus, and/or otherwise change the appearance of the identifiers; alternate the identifiers with one or more other identifiers; display a message with the identifier, between identifiers, and/or at any other suitable time; beep; vibrate; and/or to otherwise modify such identifiers more and more (e.g., more and more quickly, brightly, louder, and/or in any other suitable manner).

Moreover, in some embodiments, once two or more computer devices (e.g., computer devices 365, 375, and/or any other suitable computer devices) in a transaction come within a set distance from each other and/or another trigger has been met (e.g., a specific position in a queue has been achieved, a set time in proximity to another party of a transaction has occurred, and/or any other suitable modification factor has been met), one or more of the coordinating identifiers (e.g., all identifiers) in the transaction are modified (e.g., flash at a significantly faster rater, include one or more vibrations, include one or more sounds, include one or more messages, etc.) to indicate that two or more parties to the transaction have met, arrived at a location, are in proximity, are next in a queue, are advancing in a queue, and/or that any other applicable modification event has or will occur.

In one example, as a car carrying the first device (e.g., computer device 365) approaches a passenger having the second device (e.g., device 375), the first and second devices begin to flash (and/or otherwise modify) the coordinating identifiers (e.g., images, colored screens, etc.) of one or both devices more and more rapidly until the two parties are within a set distance from each other—at which time, the coordinating identifiers of one or both parties begin to flash (and/or otherwise be modified) at a maximum rate. Thus, in some such embodiments, as the parties look at each other's identifiers, the parties are readily able to recognize the corresponding identifier or identifiers of other parties in the same transaction (even if other parties participating in other transactions are nearby and displaying their assigned identifiers).

Where the described systems and methods automatically modify coordinating identifiers in one or more transactions based on a proximity between two or more computer devices (e.g., the first, second, and/or other devices) in a transaction (and/or based on an estimated time to meeting, a placement in a queue, and/or any other suitable factor directing identifier modification), the systems and methods can modify all of the identifiers of the transaction in the same (or similar) manner; can modify all of the identifiers, though not necessarily in the same manner; and/or can modify (in the same or different manners) the identifiers presented by or less than all of the devices in the transaction. That said, in some embodiments, when the identifier provided by one of the devices in the transaction is modified, all of the other identifiers provided by the other devices in the transaction are also modified in the same (or a very similar) manner—thus, making it easy for parties to readily recognize the identifiers of the other party or parties to their transaction.

Figure 6:
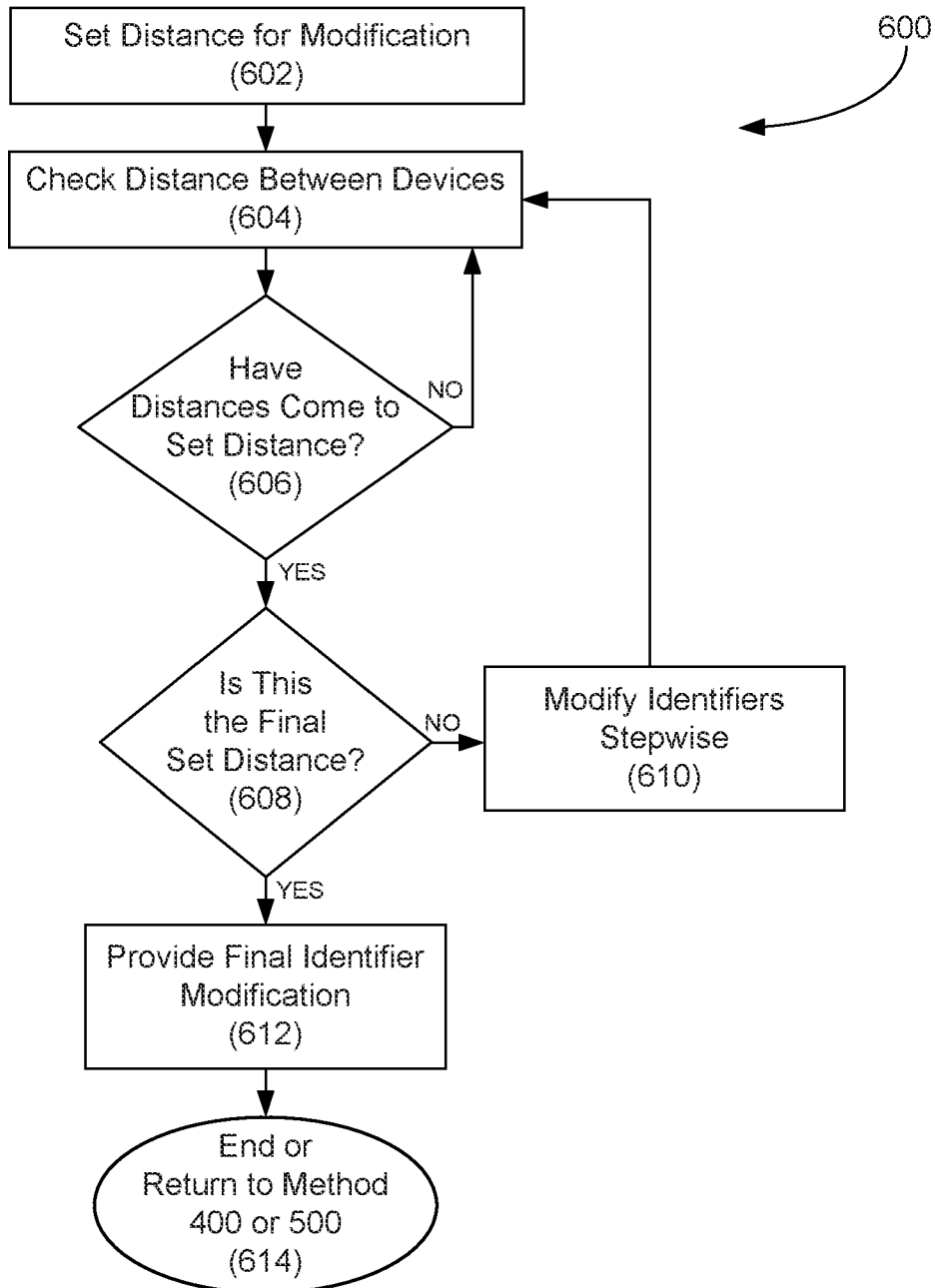
FIG. 6 illustrates a flowchart depicting a representative embodiment of a method for modifying coordinating identifiers based on proximity of one or more computer devices in a transaction.

While the described systems and methods can function in any suitable manner to modify the coordinating identifiers in a transaction based on the proximity of two or more parties to the transaction (and/or any other set modification factor), FIG. 6 shows (at step 602) that, in some embodiments, the method 600 comprises setting one or more set distances (and/or other modification factors (e.g., estimated times until a meeting, specific placements in a queue, and/or any other suitable factor)) that determine when (and how) the coordinating identifiers in a transaction will be modified. In this regard, the distances (and/or other modification factors) can be set any suitable threshold (e.g., at any suitable distances, times, queue positions, etc.) and can be set in any suitable manner, including, without limitation, by being preset, being set at the computer system (e.g., server 385), being set at the computer device of one or more parties to the transaction, and/or in any other suitable manner.

At step 604, FIG. 6 shows that, in some embodiments, the method 600 continues as a distance (and/or measurable characteristic relating to a modification factor) is tracked (e.g., via GPS coordinates, multilateration, localization, GOOGLE® maps, APPLE® maps, and/or any other suitable method), and the system (at step 606) determines whether or not at least two devices in a transaction have come to one of the set distances (and/or another modification factor has been met).

If the system determines at step 606 that the devices are not within a set distance (and/or that another modification factor has not been met), FIG. 6 shows the method 600 returns to step 604. In contrast, and in accordance with some embodiments, if the system determines that at least two devices in a transaction are within a set distance (or that one or more other modification factors have been met), the system determines (at step 608) whether such set distance (or other factor) is the trigger for the final identifier modification.

If, at step 608, the system determines that space between the devices in the transaction (and/or another modification factor) is not the trigger for the final identifier modification, the method 600 continues to step 610, and the identifiers in the transaction are modified, even if only stepwise (e.g., such that the identifiers flash a little more quickly, an estimated time to meeting is updated, a sound volume of an audible aspect of the identifier increases, and/or any other suitable modification occurs).

If, however, the system determines that the distance between two or more parties in the transaction is close enough (and/or that another modification factor has been met) to trigger the final modification, then (as shown at step 612), the method 600 continues as the final identifier modification is provided to the devices in the method (e.g., a notification is presented, the coordinating identifiers on all devices flash (in unison or otherwise) at a rapid pace, a video clip or animation is shown, and/or any other suitable modification is provided to show that two or more computer devices (e.g., phones, tablets, etc.) in the transaction are in close proximity to each other (and/or that another modification factor has been met).

As another example of a suitable optional step that can be included in the described systems and methods, in some embodiments, the described systems allow users of one or more computer devices (e.g., devices 365, 375, and/or any other suitable device) in a transaction to request that the coordinating identifiers associated with a transaction be dynamically changed, replaced, updated, and/or otherwise modified, at any suitable time and in any suitable manner. By so doing, one or more parties to a transaction can request an identifier modification, see that his or her identifier and the identifiers of one or more other purported parties to the transaction have changed in the same manner, and thereby confirm (e.g., as an additional layer of security) that the other party or parties having the newly modified and matching coordinating identifier are all part of the same transaction. Accordingly, if any party to a transaction has any doubts that someone else with a matching coordinating identifier is truly a party to the same transaction as the party in doubt, the party in doubt can easily remove his or her doubts by requesting for an identifier modification (e.g., via the computer device of the party in doubt and/or any other purported party to the transaction) and then checking to see that the updated identifiers still coordinate (or match).

In another example of a suitable optional step, some embodiments of the described systems and methods are configured to check and ensure that, unless such computer devices are part of a specific transaction, one or more computer devices in proximity to one or more other computer devices (e.g., the first 365 and/or second 375 devices) participating in the specific transaction do not have an identifier that coordinates with the coordinating identifiers assigned to that specific transaction. In this manner, the described systems and methods can prevent parties that are in the same general vicinity and that coincidentally have the coordinating identifiers from inadvertently believing that parties are actually part of the same transaction.

Figure 7:
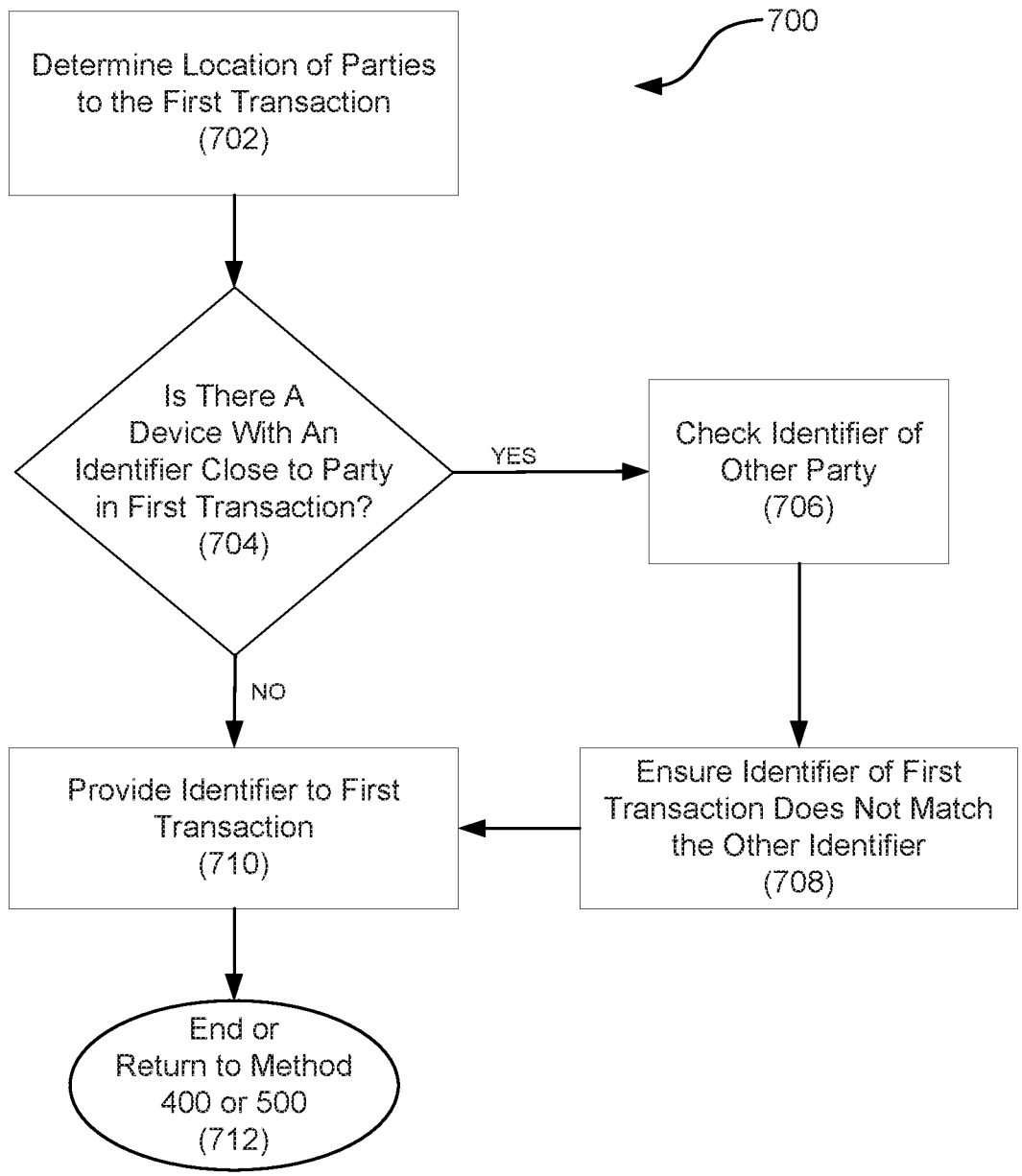
FIG. 7 illustrates a flowchart depicting a representative embodiment of a method for preventing a coordinating identifier from a first transaction from being the same as a coordinating identifier from a second transaction when a computer device from the first transaction is in proximity to a computer device from the second transaction.

While the described systems and methods can ensure that the coordinating identifiers of one transaction do not coordinate (or match) with an identifier of another transaction when one or more devices from the separate transactions are in close proximity to each other, FIG. 7 shows a representative embodiment of a method 700 that involves (as shown at step 702) determining the location of the parties to a transaction. In this regard, the system can determine the location of the computer devices pertaining to the parties in a first transaction in any suitable manner, including, without limitation, by: checking GPS coordinates of the devices in the transaction(s), checking IP addresses of such devices, multilateration techniques, localization techniques, using information provided by one or more users in the first transaction (e.g., addresses, current location, desired location, etc.), checking proposed travel routes of the devices (e.g., via GOOGLE® maps, APPLE® maps, electronic maps, electronic schematics, electronic plans, etc.) and/or by any other suitable method.

Step 704 shows that, in some embodiments, the method 700 continues as the system (e.g., the computer system or server 385 and/or one or more computer devices) determines whether or not any third party device pertaining to another transaction (e.g., a second and/or any other transaction) is (or may move to be) in proximity to a device pertaining to the first transaction. If the system determines that a third-party device is in proximity (or that may likely come into proximity) with a device of the first transaction, step 706 shows the method 700 includes checking the identifier of the third-party device, and step 708 shows that the method 700 then includes ensuring that the identifiers of the first transaction do not match with the third-party identifier. While this can be accomplished in any suitable manner that allows the various transactions in proximity to each other to each have distinct identifiers, in some embodiments, the system simply selects an identifier for the first transaction that does not match the third party's identifier. In some embodiments, the system changes the identifier of the third party, along with the coordinating identifiers of any other parties to the third-party transaction. In still other embodiments, the system changes the identifiers of the third-party transaction and further provides the first transaction with an identifier that does not match the identifiers that are newly assigned to the third-party transaction.

Whether or not the system determines at step 704 that there is a third party in a separate transaction and who is in proximity (or who may likely or even possibly come into proximity) with one or more parties to the first transaction, FIG. 7 shows that, in some embodiments, the method 700 continues as the system assigns an identifier to the current transaction (e.g., the first transaction). As discussed above, as the system assigns an identifier to the first transaction, the system ensures that the identifier of the first transaction does not coordinate with an identifier of the third-party transaction (which has one or more parties who are within a set area with a party of the first transaction and/or who may likely cross paths or come into proximity with a party of the first transaction (e.g., as determined based on planned party routes, on set territories, and/or otherwise)). Once such an identifier is assigned to the first transaction, FIG. 7 at step 712 shows that some embodiments of the method 700 end or continue on (as applicable) in methods 400 and/or 500.

Returning to the non-limiting description of optional steps that can be included in the described methods, in some embodiments, the described systems and methods are configured to allow the remote computer system (e.g., the computer system or server 385) and/or one or more computer devices (e.g., the first 365 and/or second 375 computer devices) to pass an assigned identifier to one or more other devices. Although in some embodiments, the system is configured to pass the identifier from a first device to one or more other devices without leaving the identifier on the first device (e.g., such that the first device is no longer a party to the transaction), in some other embodiments, a user of the first computer device is able to pass or otherwise send an identifier received from the remote computer system to one or more other computer devices, while still maintaining the identifier on the first device (e.g., such that the first device and the newly invited device or devices are all parties to the same transaction). In some other embodiments, however, the remote computer system and/or one or more other devices pertaining to a transaction are able indicate that one or more parties in the transaction cannot pass their identifier on to another.

A feature that allows the computer system (e.g., server 385) and/or one or more parties to a transaction to pass an identifier of the transaction to one or more other parties (e.g., to one or more devices that were not originally part of the transaction) can be useful in a wide variety of circumstances. In one example, if a potential rider desires to share a car ride with another, the potential rider may invite another person to the transaction by sending a copy of the identifier to the other person's computer device (e.g., via near field communication, BLUETOOTH® communication, a text, an email, an RF communication, and/or in any other suitable manner). In another example, where a potential rider desires to allow some else to get a ride first, the potential rider can pass his or her identifier to another person's device and then enter into another transaction to get a ride, In still another example, where a transaction is set up to orchestrate the delivery of a package from a first party to a second party via a third party (e.g., a courier), and the third party is only able to carry the package on a portion (or leg) of the trip, the third party can (in some embodiments) pass the package and the identifier pertaining to the transaction to a fourth party (e.g., one or more other approved couriers), such that when the fourth party delivers the package to the second party, the second and fourth parties can compare identifiers and ensure they are meeting the right people and that the package is being delivered to the proper person.

Where the remote computer system (e.g., the server 385) and/or one or more parties to a transaction are able (e.g., via their computer devices 365, 375, etc.) to pass an identifier of the transaction to one or more other parties, the described systems and methods can treat the parties that have newly entered into the transaction in any suitable manner. Indeed, in some embodiments in which the described systems and methods are tracking a location of, billing, sending information to, receiving information from, preventing undesirable identifier matching with, and/or otherwise interacting with one or more parties (and/or computer devices) who originally belonged to a transaction, the described systems optionally begin to interact in one or more of the same ways with the device of the party who has newly entered the transaction. By way of non-limiting example, where one party riding in a car (e.g., via an UBER® ride or otherwise) invites another party to join in the car ride after the first rider has already ridden for a period of time, the system can begin to track the new rider so as to just bill the new rider for the distance he or she actually travels in the car.

As another example of a suitable optional step, some embodiments of the described systems and methods allow one computer device (e.g., the first computer device 365) to be part of multiple transactions and to display and/or otherwise provide an identifier that coordinates with the identifiers of each of the multiple transactions. Such feature may be useful in a variety of circumstances and for a variety of purposes. By way of non-limiting illustration, when multiple people in an event (e.g., a stadium, concert hall, or other location) each use the described systems and methods to set up an individual transaction (e.g., to purchase a concession item or otherwise), and one server becomes a party to each such transaction, the described systems and methods can help ensure that the server is able to find and identify each party and vice versa.

Where one device (e.g., a first device 365 and/or any other suitable device or devices) is able to participate in multiple transactions, the described device can display and/or otherwise provide the identifiers for the various transactions in any suitable order and/or at any suitable time. By way of non-limiting example, a first device can display and/or otherwise provide the identifiers of one of the transactions to which the first device is a party based upon: a proximity of the first device to another device that is in a transaction with the first device (e.g., showing the identifier assigned to the closest device to the first device), the queue placement of another party who is in a transaction with the first device (e.g., showing the identifier of the party or transaction that is next in the queue), a random determination of which identifier to show, and/or any other suitable criterial and/or determination.

Figure 8:
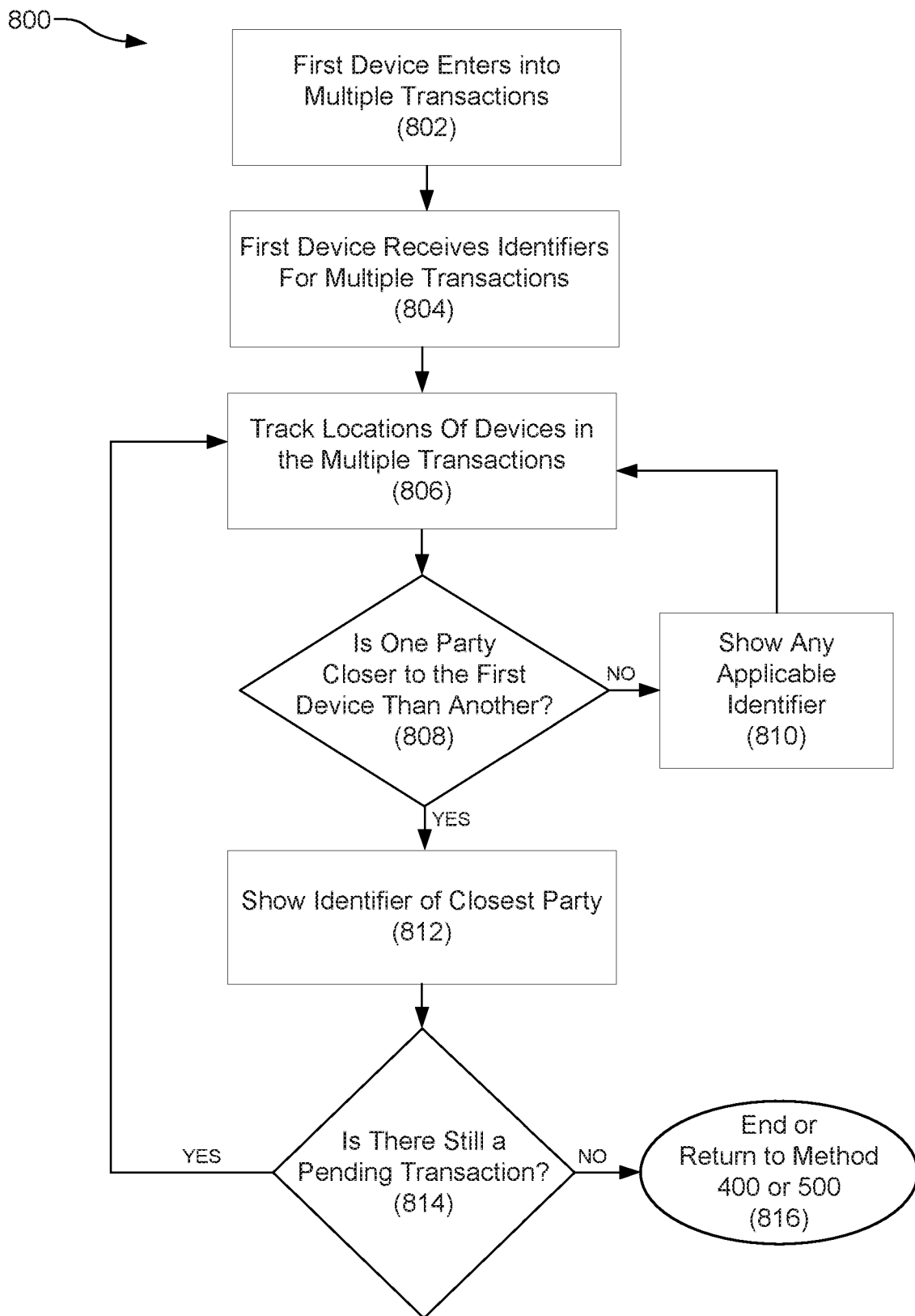
FIG. 8 illustrates a flowchart depicting a representative embodiment of a method for displaying a coordinating identifier on a computer device that is participating in multiple transactions.

In some embodiments in which the described systems and methods allow the first computer device 365 (and/or any other computer device) to be part of, and have coordinating identifiers for, multiple transactions, the described systems and methods optionally allow and/or ensure that the first computer device displays and/or otherwise provides the identifier coordinating to the transaction of the closest device that is part of one of the multiple transactions to which the first device is a party. By way of non-limiting example, where a server (or other party) who is participating in ten transactions (e.g., is assigned to deliver goods to ten parties) approaches a party to a first of the ten transactions, the server's computer device (e.g., phone, tablet, and/or other computer device) will display the identifier corresponding to that first party—thus the server and the first party will be able to readily compare identifiers and recognize each other. In this example, once the server has provided the first party with the purchased goods or services, the server's device can then display or otherwise provide the identifier for (and/or map with a route to) the next closet applicable party (e.g., device) to the server.

Where the described systems and methods allow a single device (e.g., the first 365 or second 375 device) to participate in multiple transactions and to display and/or otherwise provide the identifier to closest applicable party, the systems and methods can be performed in any suitable manner. In this regard, FIG. 8 shows a representative embodiment of one such method 800. In particular, FIG. 8 shows that, in some embodiments, the method of this optional step begins at step 802 as a first device enters into multiple transactions, and continues at step 804 as the first device receives identifiers for the multiple transactions.

At step 806, FIG. 8 shows that, in some embodiments, the method 800 continues as the system tracks the locations of (and/or the queue placement, status of an applicable order, and/or any other suitable information pertaining to) each of the parties in the multiple transactions to which the first device is a party. As described above, this tracking can be accomplished in any suitable manner, including, without limitation, by: checking GPS coordinates of the devices in the transaction, checking IP addresses of such devices, multilateration techniques, localization techniques, using information provided by one or more users in the transaction (e.g., addresses, current location, desired location, etc.), receiving information from the applicable devices, receiving information from the server 385, and/or any other suitable method.

At step 808, FIG. 8 shows that, in some embodiments, the method 800 continues as the system determines whether one device of the multiple parties to which the first device is party is closer to the first device (and/or whether one party is closer in a queue to that parties turn than another, whether the status of one order has progressed further than another, and/or whether there is any factor that indicates that one transactions identifier should be displayed and/or otherwise provided before the identifier of another transaction). If there is not, then the first device can display or otherwise provide any material, including, without limitation, maps to one or more parties in applicable transactions, estimated times until an order is ready, identifiers for multiple parties (e.g., providing multiple identifiers at once, for instance on a split screen; alternating through the identifiers being provided; displaying any of the applicable identifiers (e.g., as shown at step 810); and/or in any other suitable manner); and/or any other suitable material. In some embodiments, if the system determines that no party from the multiple transactions to which the first device is a party is closer than another (or should otherwise have its identifier displayed before another identifier), the method continues as the system continues to check the locations of (and/or other suitable information relating to) the multiple parties, with respect to the first device or otherwise.

Once the system (e.g., the server 385 and/or any other suitable portion of the overall system) determines that the device (e.g., the second device 275) of one of the multiple transactions to which the first device 365 is a party is closest to the first device (and/or that another factor relating to the second device otherwise meets a set criterion indicating that the identifier of the second device should be shown before that of another transaction), step 812 of FIG. 8 shows that, in some embodiments, the method 800 continues as the first device provides the identifier of the closest party (and/or of the transaction that is next in a queue and/or that otherwise meets a set criterion indicating that the identifier of a certain transaction is to be displayed next).

Next, at step 814, after the first party with the first device has completed a transaction (or at least a portion of such transaction) with one party, FIG. 8 shows that, in some embodiments, the described systems and methods include determining whether any other transactions to which the first device (and first party) are a party are still open. If there are, FIG. 8 shows that some embodiments of the method return to step 806. Once, however, all of the transactions to which the first party is a party are complete, FIG. 8 (at step 816) shows that, in accordance with some embodiments, the method 800 ends and/or returns to method 400 and/or 500.

As another example of a suitable optional step that can be included in the described systems and methods, some embodiments of the described systems and methods are configured to track and record (e.g., in memory 220 of the server 385, in memory of one or more computer devices in a transaction, and/or elsewhere) at least one of the times, paths, distances, frequencies, and/or other recordable characteristics of when two or more computer devices in a transaction (e.g., devices comprising coordinating identifiers) are in a desired proximity to (and/or out of a desired proximity with) each other. Such a feature can be useful for a variety of purposes, including, without limitation, determining that a transaction has been completed, tracking and otherwise helping protect the safety of parties involved in one or more transactions, ensuring that bills are accurate, and/or for any other purpose. In this regard, the described systems can track and record information relating to meetings between (and/or separation from) parties to a transaction in any suitable manner, including, without limitation, by recording GPS coordinates of the devices in the transaction, recording IP addresses of such devices, multilateration techniques, localization techniques, recording information provided by one or more users in the transaction (e.g., addresses, current location, desired location, confirmation of receipt, etc.), and/or any other suitable method.

In another example of a suitable optional step, some embodiments of the described systems and methods allow at least one of the remote computer system (e.g., the server 385), a first device 365, a second device 375, and/or any other computer device in the system to provide one or more identifiers (e.g., visual, audio, touch, and/or other identifiers) through one or more objects (e.g., vehicles, speaker systems, watches, ear pieces, headsets, display screens, pagers, projectors, and/or other devices) that are in signal communication with at least a portion of the described system (e.g., at least one of the remote computer system, the first computer device, and the second computer device).

In one non-limiting example illustrating how the described systems and methods can provide a coordinating identifier through an object that is in signal communication with a portion of the system, in some embodiments, the remote computer system (e.g., the server 385), the first computer device 365, and/or the second computer device 375 are configured to control a car's lights, horn, speakers, PA system, and/or other visual and/or audio outputs to help provide a coordinating identifier (and/or to otherwise alert a potential party to the car's presence). For instance, in some embodiments, as such a car comes into proximity with the computer device of another party that is part of a transaction with the computer device (or driver) being carried by such car, the car can be used to: flash its headlights (e.g., at the same time the identifier on the intended passenger's phone or other device flashes, and/or in any other suitable manner); make a sound (e.g., play music that corresponds to music being played by the potential passenger's phone, and/or make any other suitable sound); and/or otherwise provide a coordinated identifier and/or notify the intended passenger of the car's presence.

In another non-limiting example illustrating how the described systems and methods can provide an identifier through an object that is in signal communication with a portion of the system, in some embodiments, the system is configured to provide one or more coordinating identifiers through one or more displays. For instance, in some embodiments, a car driver who is part of a transaction may receive a coordinating identifier on a first computer device 365 (e.g., the driver's phone), which, in turn, provides the same coordinating identifier to a display that is visible from outside the car (e.g., a display that is: placed facing out from a window of the car, such as the windshield, passenger side window, etc.; a heads-up display shown on a car window; and/or in another manner that is otherwise visible to potential passengers). In some other embodiments, the coordinating identifier may be provided directly to such a display (e.g., without being provided to a separate computer device). In both such embodiments, the driver can provide the coordinating identifier, without being unduly distracted (e.g., trying to find his or her phone and to lift it up so that intended passengers can see it).

In yet another non-limiting example illustrating how the described systems and methods can provide an identifier through an object that is in signal communication with a portion of the system, in some embodiments, a portion of the system is configured to communicate with an output that is capable of providing a coordinating identifier (e.g., one or more displays, speakers, lights, and/or other suitable outputs). By way of example, in some embodiments in which a group of people are being sent to various locations and/or are otherwise being divided into smaller groups (e.g., to break up groups in a class, conference, and/or for any other suitable purpose), a portion of the system (e.g., the server 385, the first computer device 365, etc.) can send various identifiers to one or more identifier outputs (e.g., displays) and can send coordinating identifiers to the various computer devices (e.g., phones) of such people—thus directing the various people to their coordinating identifier and/or the output providing such identifier.

Returning again to the non-limiting description of the optional steps that can be included in the described methods, in some embodiments, the described systems and methods are configured to use of facial, optical, Wi-Fi, BLUETOOTH®, and/or visual recognition technology to identify one or more parties to a transaction, to cause the coordinating identifier to be provided, to trigger a modification of the coordinating identifier or identifiers in a transaction, and/or for any other suitable purpose. While this can be accomplished in any suitable manner, in some embodiments, the described systems and methods include obtaining and analyzing (e.g., via software accessed through any suitable portion of the described system) an image of a desired object (e.g., a picture of a party to a transaction, such as a driver, a passenger, and/or any other suitable party; a car associated with a party to the transaction; a landmark associated with the transaction; and/or any other suitable object or objects).

Once an image of the desired object has been obtained and analyzed, some embodiments of the described system are configured to capture images (e.g., via a camera and/or sensor in signal communication with the system, for instance through a computer device of a party to the transaction) and to notify one or more parties to a transaction once that object has been detected. In one example, as an intended passenger holds up his or her phone (e.g., displaying an identifier or otherwise) and a camera and/or other sensor on that phone captures an image of the intended car and/or driver, the described systems and methods can alert the intended passenger that his or her car has arrived (e.g., by flashing and/or otherwise modifying the identifier, posting a message, and/or in any other suitable manner).

In still another example of a suitable optional step, some embodiments of the described systems and methods are configured to provide one or more computer devices in the described system with promotional materials, advertisements, pop-up ads, coupons, information, reading material, and/or any other suitable material in connection with an identifier and/or in any other suitable manner. The content, timing, and other factors relating to the provision of such material can be determined in any suitable manner, including, without limitation, by being randomly selected; being selected based on one or more locations, desired locations of, events in proximity to, retailers and/or service providers in proximity to, preferences, and/or any other factors relating to one or more parties of a relevant transaction; and/or in any other suitable manner. Indeed, in some embodiments, the provision of such material is personalized for the individual receiving it (e.g., by being based on a user's browsing history, a user's preferences, a user's location, and/or in any other suitable manner).

In yet another example of a suitable optional step, some embodiments of the described systems and methods are configured to encrypt (e.g., via symmetric key, encryption, public key encryption, and/or otherwise) and/or to otherwise encode information being relayed about one or more parties and/or coordinating identifiers. In this manner, the described systems and methods can help prevent others from hacking into the system to thereby create fake identifiers. Thus, some such embodiments provide an additional layer of safety and confidence for parties to transactions.

Figure 9:
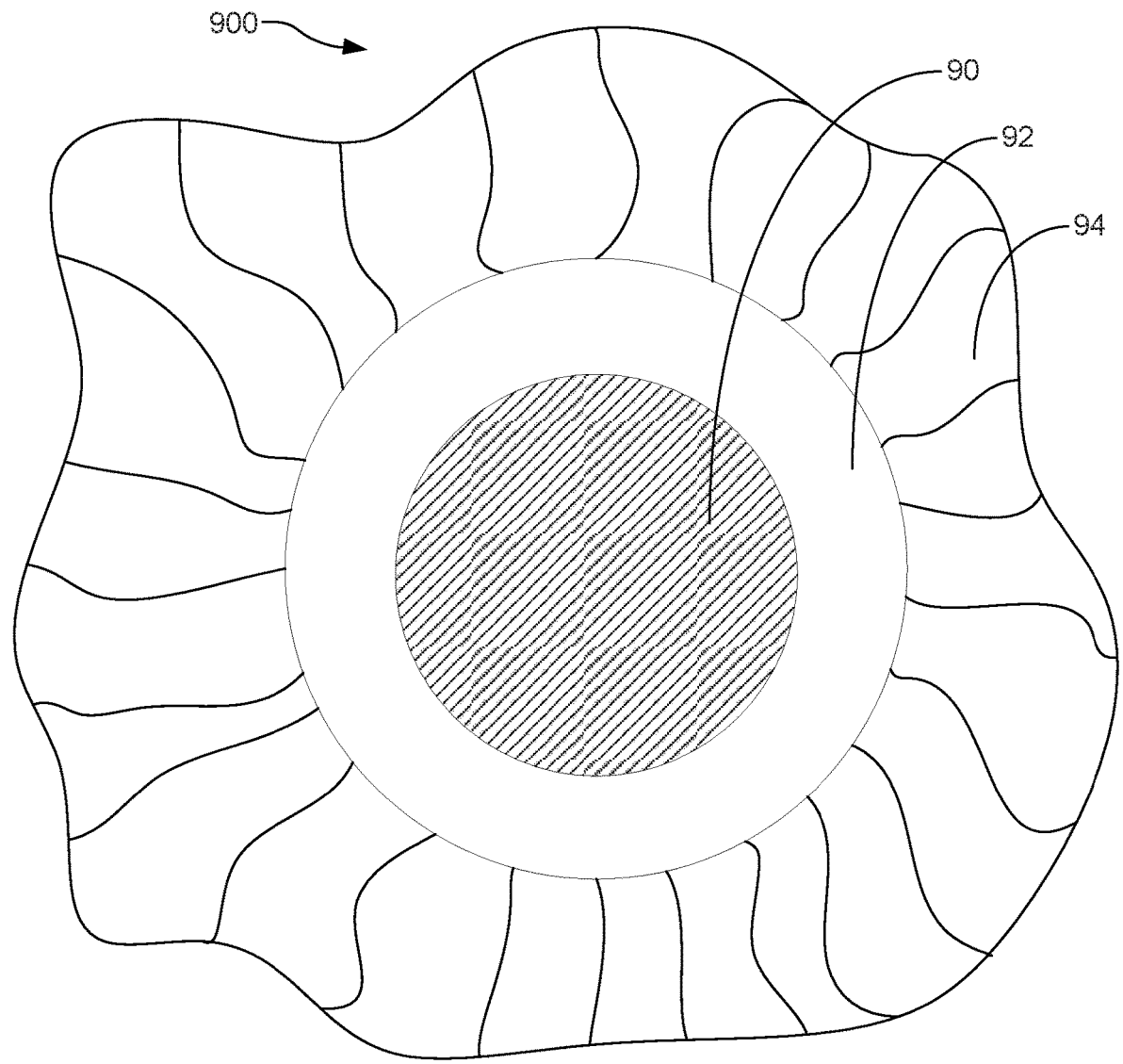
FIG. 9 illustrates a feature of some embodiments of the invention in which a coordinating identifier is made available to computer devices in a first radius, is not made available to computer devices that are outside the first radius but that are inside a second radius, and is made available outside the second radius.

In still another example of a suitable optional step, some embodiments of the described systems and methods are configured to ensure that one or more identifiers are only provided within a certain location and not outside that location. By way of non-limiting illustration, FIG. 9 shows that, in accordance with some embodiments, some identifiers are only provided within one or more certain geographic locations 90 (which may include, but is not limited to, one or more rooms, buildings, radii, set pieces of land, set neighborhoods, specific cities, portions of a venue, specific states, specific countries, and/or any other suitable locations). In some embodiments, however, as shown in FIG. 9, while one or more identifiers are provided within a specified geographic area 90, and while such identifiers are not available in a zone 92 that is outside, surrounds, flanks, is adjacent to, and/or that is otherwise near the specified geographic area, such identifiers can (in some embodiments) be available in one or more locations 94 that are outside of such a zone 92. Accordingly, in some such embodiments, the described systems and methods can further prevent parties from improperly receiving coordinating identifiers with one or more other parties who are not all participating in the same transaction.

In another example of a suitable optional step, some embodiments of the described systems and methods allow one or more parties within a transaction to text, instant message, e-mail, call, send audio to, send images to, video chat with, send updates to, provided new location information, provide new offer information to, provide new request information to, and/or to otherwise communicate with each other.

In even another example of a suitable optional step, the described systems and methods can dispose of identifiers in any suitable manner (e.g., when the identifiers are modified, when a transaction is complete, and/or at any other suitable time). Indeed, in some embodiments, once an identifier is no longer needed in a particular transaction (and/or portion of a transaction), the identifier can: be reused (e.g., by the same party and/or different party), dissolve, self-destruct, be saved in a collection of identifiers received by each individual party, and/or otherwise handled in any suitable manner. Indeed, in some embodiments, the identifiers provided to each party are saved in an account, on that party's device, and/or otherwise (e.g., like stamps in a passport).

In another example of a suitable optional step, some embodiments of the described systems and methods are configured to learn from prior transactions and to update estimates, determine parties in a transaction, predict actions of parties in a transaction, and/or to otherwise modify the transaction (e.g., to change when coordinating identifiers are given to the parties, to change estimated times of arrival, to change the timing in which notices are given to one or more parties, to modify proposed routes one or more parties can take to meet another party in a transaction, and/or to otherwise modify and/or optimize the transaction in any suitable manner).

In yet another example of a suitable optional step, some embodiments of the described systems and methods are configured to track two or more computer devices (e.g., 365, 375, etc.) in one or more transactions and to determine the fastest and/or any other preferred route between the parties (and/or one or more desired locations). In such embodiments, the system may determine such a route in any suitable manner, including, without limitation, by tracking the parties' computer devices (e.g., via GPS, multilateration, etc.); via mapping software (e.g., GOOGLE® maps; APPLE® maps; software utilizing venue maps, building maps, schematics, and/or any other suitable information; and/or any other suitable mapping software).

The described systems and methods can be useful in virtually any suitable circumstances in which two or more parties want to identify each other (and/or one or more corresponding computer devices) with confidence. Some non-limiting examples of situations in which the described systems and methods may be used, include in the areas of transportation (e.g., allowing one or more drivers and one or more intended passengers to readily identify each other), courier services (e.g., allowing one or more senders and/or recipients to rapidly and confidently identify one or more couriers and vice versa), event ticketing (e.g., where an identifier functions as one or more tickets), concessions (e.g., allowing one or more concession workers to identify one or more patrons), and queue management (e.g., alerting parties when their turn in a queue has arrived and providing such parties with a coordinating identifier to identify them and/or their place in the queue).

Indeed, in some embodiments, the described systems and methods are used to help two or more parties identify each other for transportation services (including, without limitation, via one or more UBER® rides, LYFT® rides, taxi rides, bus rides, airplane rides, ferry rides, bike taxi rides, rickshaw rides, horse and carriage rides, limo rides, hitch hiking, etc.). While the described systems and methods can be used with transportation services in any suitable manner, FIG. 10 shows one non-limiting example of a suitable method 1000 (e.g., as depicted from a computer device of a potential passenger).

Figure 10:
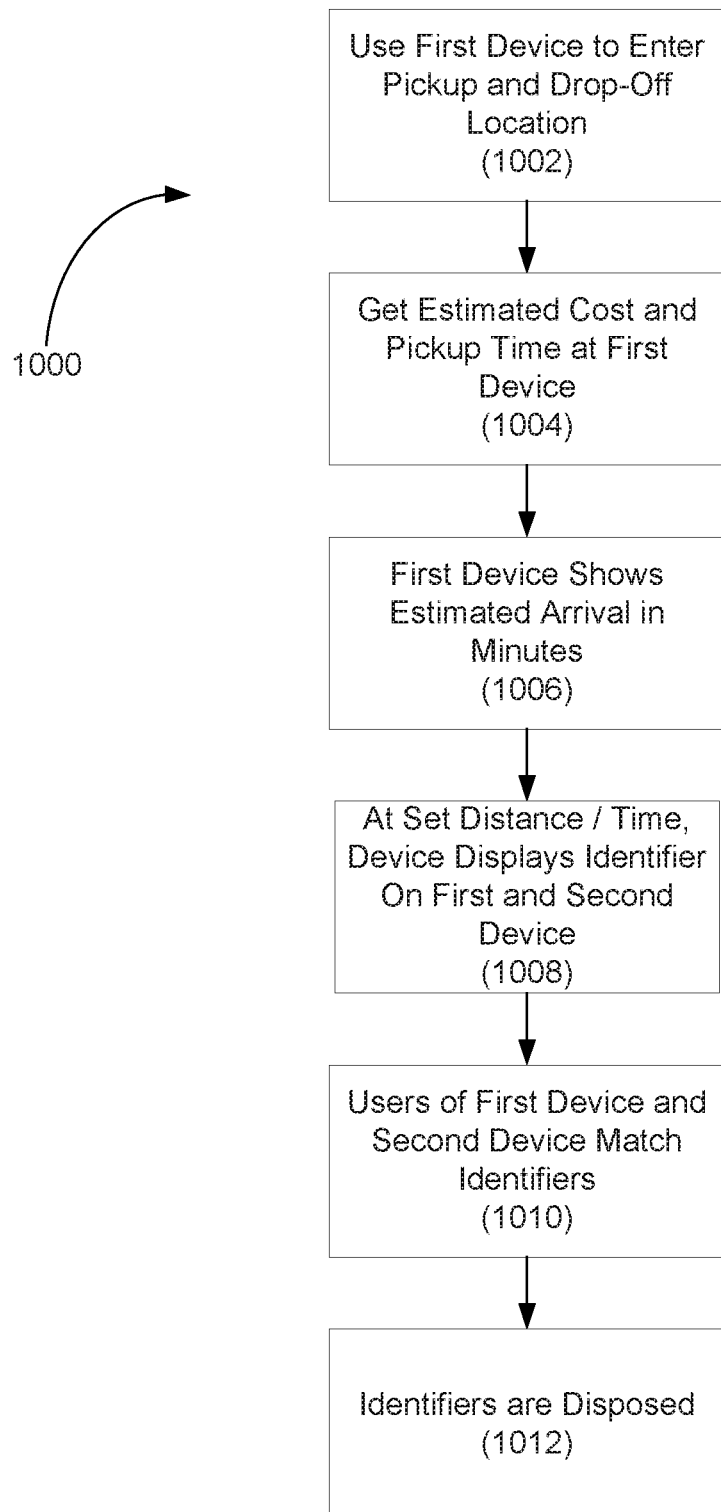
FIG. 10 illustrates a flowchart depicting a representative embodiment of a method for using coordinating identifiers to help a potential driver and one or more intended passengers to identify each other.

In particular, FIG. 10 shows that, in some embodiments, the method begins (at step 1002) as a potential passenger uses a first computer device 365 (e.g., a smart phone, tablet, and/or any other suitable computer device) to request a ride (e.g., by entering a desired pickup location, drop-off location, pick-up time, vehicle type, fare rate, whether or not the passenger desires to ride alone and/to split fair with another passenger, and/or any other suitable information). While not shown, a potential driver may also provide the described system with any suitable information (e.g., that the driver is willing to drive others, the driver's location, the type of vehicle the driver is driving, the number of seats in the vehicle, how far the driver is willing to drive, how long the driver is willing to drive, and/or any other suitable location).

At step 1004, FIG. 10 shows that some embodiments of the method 1000 continue as the potential passenger and the selected driver enter into a transaction and the system provides the passenger and/or the driver with an estimated cost of the ride and an estimated pickup time.

Step 1006 shows, that in some embodiments, the described method 1000 provides the parties to the transaction (e.g., the passenger and/or driver) with estimated times (continuously or otherwise) until the pickup (e.g., in seconds, minutes, hours, and/or otherwise). Additionally, in some embodiments, the described systems and methods are configured to show one or more parties to the transaction (e.g., via the first device 365 and/or the second device 375) one or more maps, indicating the current locations of one or more parties to the transaction, proposed travel routes, traffic delays, and/or any other suitable information.

Although the described systems and methods can provide the various parties to a transaction (e.g., via the first computer device 365, the second computer device 375, and/or any other computer device) with coordinating identifiers at any suitable point before, during, and/or after a transaction, step 1008 shows that, in some embodiments, the described systems and methods provide the parties to the transaction with (and/or modify the) coordinating identifiers when the distance and/or estimated time between the various parties meets a specified trigger point. Thus, step 1010 shows that, in some embodiments, the parties to the transaction (e.g., the driver and passenger) can readily identify each other (e.g., by holding up phones, displays, and/or other computer devices displaying and/or otherwise providing the coordinating identifiers, such that each party is able to readily see (and/or otherwise perceive) and match the identifier of the other party. At step 1012, FIG. 10 shows the method 1000 can proceed in any suitable manner, including, without limitation, by recycling the identifiers, storing the identifiers in accounts for one or more parties, requiring one or more parties to pay a bill, and/or in any other suitable manner.

Although the method 1000 described in FIG. 10 describes a transaction comprising two parties (e.g., a driver and a passenger), the described systems and methods can be modified to include any suitable number of parties (e.g., any suitable number of drivers (e.g., for various legs of trip and/or for any other suitable purpose) and/or any suitable number of passengers (e.g., in the same or different transactions and with the same and/or different coordinating identifiers)). Indeed, in some embodiments, one transaction comprises multiple parties (e.g., drivers and/or multiple passengers) that all have the same coordinating identifiers. In other embodiments, however, a one party (e.g., the driver) driver may be party to multiple transactions, which each have a different identifier (e.g., as described above with respect to the method 800 in FIG. 8).

While the described systems and methods can be useful for several reasons when used to identify parties in transactions relating to transportation, some embodiments provide several beneficial characteristics over some conventional methods for identifying one or more potential drivers and passengers. Indeed, some conventional methods for identifying parties in a transportation transaction provide a driver with a location of the passenger, and provide the passenger(s) with a picture of the driver's car and/or the driver, as well as with the driver's license plate number. In some cases, however, such conventional methods have shortcomings. For instance, when using some such conventional methods, a driver who pulls up to a large group of people who are waiting for various drivers (e.g., a group of people who have just left a large event), the driver may have to call out the name of his or her intended passenger to actually find the right passenger.

Additionally, under some conventional methods, where a large group of people are waiting in the dark for their respective drivers, the potential passengers may have a hard time identifying their driver. For instance, where multiple drivers have similar cars (e.g., TOYOTA® Priuses), it may be hard for passengers to readily identify their ride—especially in the dark where it may be hard to distinguish cars by color, where cars' headlights make it hard for passengers to read front facing license plates, where cars are lacking a front facing license plate, and/or for any other reason.

In contrast with some such conventional methods, some embodiments of the described systems and methods provide each party to a transaction with coordinating identifiers (e.g., a visual symbol and/or color scheme) that can be seen and/or otherwise perceived relatively easily (as the parties display their identifiers), and that can be readily distinguished from other identifiers of other transactions. Accordingly, in some embodiments, no matter how dark the night, no matter how similar the cars may appear, no matter how similar the various drivers may appear, and no matter how many people are waiting for a ride, the parties to a transaction can readily and confidently identify and each other.

Additionally, in some embodiments, even when users of devices (in any suitable situation) cannot see and/or otherwise perceive the identifiers of other devices that are in proximity and/or potential proximity to such users (and/or such users' devices) and where such other devices are not participating in the same transaction of such users, the described systems and methods are able to ensure that the identifiers of the separate transactions do not coordinate with each other (e.g., by automatically changing one transaction's identifiers, by preventing certain identifiers from being used in another transaction, and/or in any other suitable manner). Accordingly, in some embodiments, the described systems and methods are able, behind the scenes as it were, to prevent parties from improperly identifying and believing that one or more parties belong to a certain transaction when they in fact do not.

With reference now to courier services, the described systems and methods can be used to help parties trying to send, deliver, and/or receive a package (and/or any other suitable goods and/or services) to readily identify those who are part of an applicable transaction. While the described systems and methods can be used in any suitable manner in such circumstances, FIG. 11, shows that, in some embodiments, one such method 1100 includes (as shown at step 1102) allowing one party to request a pickup or drop off (e.g., of a package) and to indicate and/or agree to a time and place for the pickup/drop off, while another party (e.g., a courier) can communicate with the first party to agree to and/or to otherwise determine a pickup site and time.

Step 1104 shows that some embodiments of the described systems and methods: track the locations of one or more parties to the transaction; create a dynamic history tracking movements and/or average times needed for one or more parties to the transaction to travel certain places at certain times; provide an estimated time to arrival; and/or otherwise provide information that facilitates the transaction. By way of non-limiting example, some embodiments of the described systems and methods, indicate an estimated time until the courier will arrive at a pickup spot and can even provide the person providing an item with an estimate of how long it will take that person to get to the pickup spot, indicating when such person should leave for the pickup spot.

Figure 11:
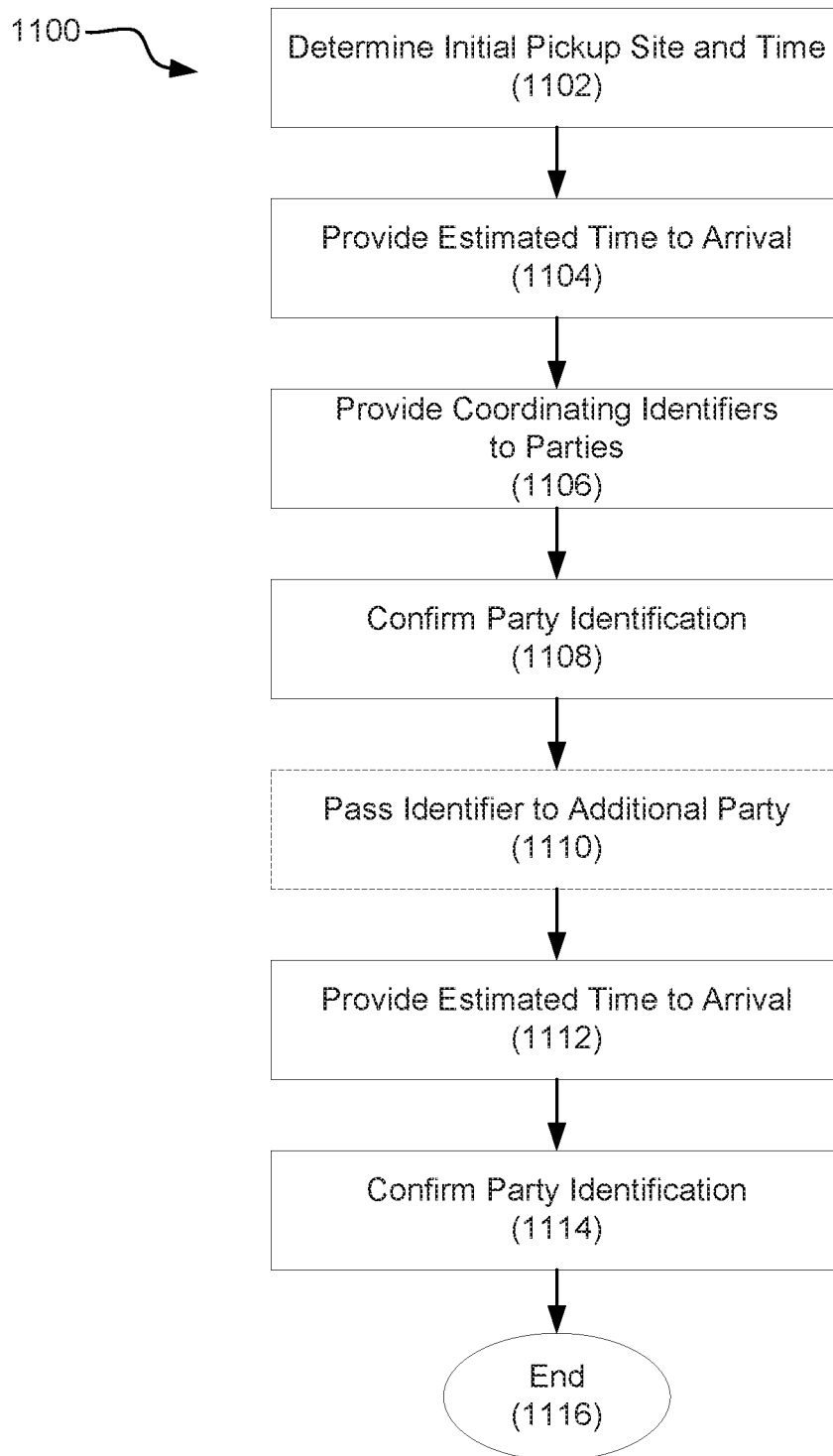
FIG. 11 illustrates a flowchart depicting a representative embodiment of a first method for using the described systems and methods in a courier service.

Step 1106 shows that some embodiments of the method 1100 shown in FIG. 11 include providing each party to the courier transaction (e.g., the courier, the person providing a package or other item to the courier, and/or any other suitable party) with a coordinating identifier (e.g., a visible and/or other identifier that can be shown on a smart phone or other computer device), which can readily be identified by the various parties of the transaction to ensure that the intended parties are meeting (e.g., at the identified pickup spot).

Figure 12A:
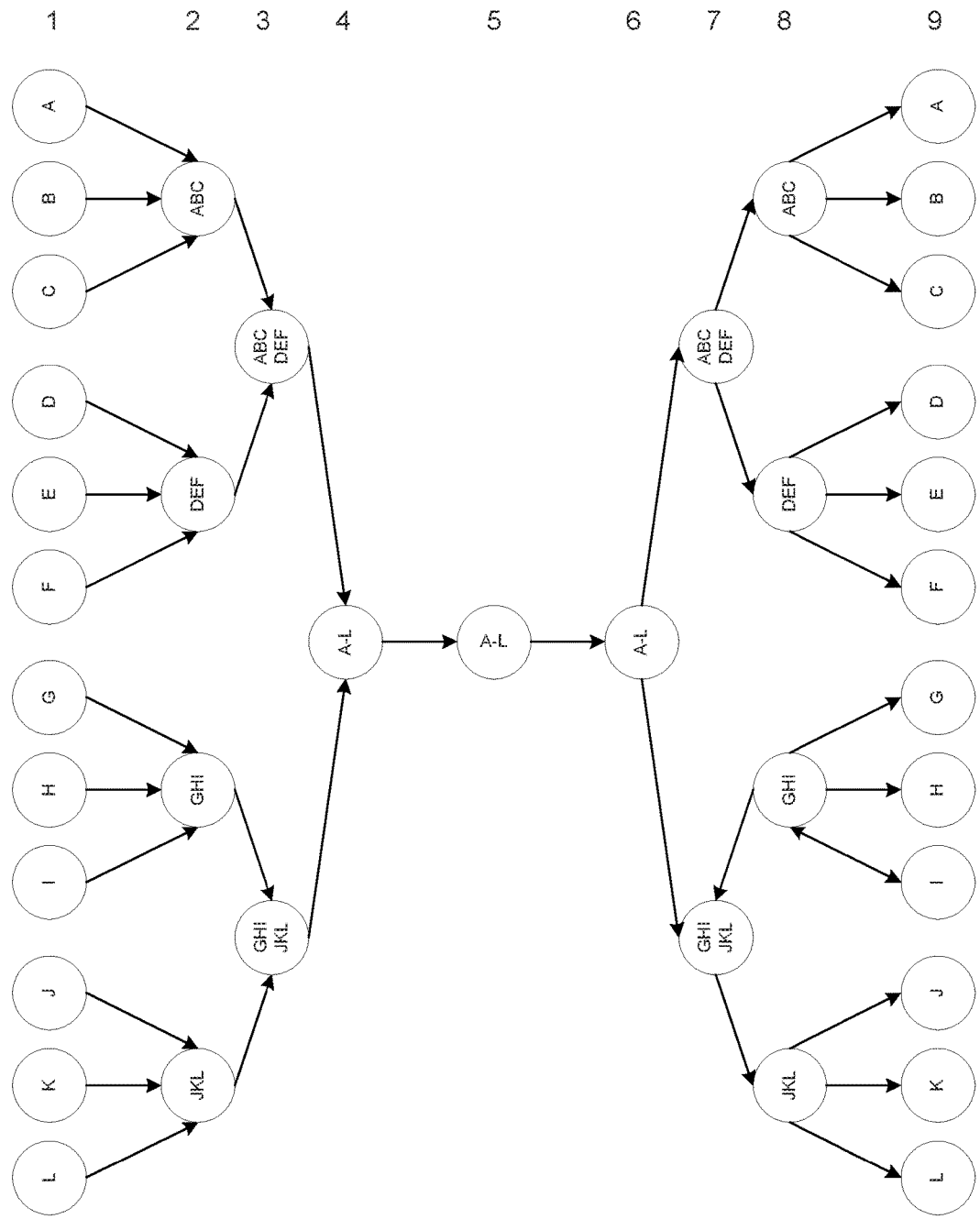
FIG. 12A illustrates a diagram showing a representative embodiment of a method for using the described systems and methods in the courier service.

As shown at step 1110, at any point in a transaction, one or more parties to the transaction can pass a coordinating identifier to another party (e.g., to another party's device). Accordingly, in some embodiments, multiple people may be involved in a transaction (e.g., to make it more efficient, faster, more economical, more convenient, and/or to otherwise help complete the transaction). By way of non-limiting illustration, FIG. 12A shows that, in some embodiments, multiple couriers (as illustrated by the circles at the left in column 1) use the same and/or a different coordinating identifier (e.g., the various letters in FIG. 12A showing an optional embodiment in which each transaction comprises a separate identifier) to pick up packages (e.g., by matching identifiers with applicable parties). In some such embodiments, the couriers then optionally pass the packages and the corresponding coordinating identifiers onto one or more other couriers (e.g., couriers who have the same coordinating identifiers, as shown in column 2), who in turn, optionally provide the packages (and/or other items) to one or more other couriers who are passed or otherwise have matching identifiers (e.g., as shown in columns 3-9), until the final courier (e.g., shown in column 9) is able to provide the package (and/or other item) to its intended recipient (not shown) by having the final courier and the intended recipient match identifiers, as shown at step 1114 in FIG. 11. Thus, although a single courier can use the described systems and methods to take an item from its sender to its recipient, in some other embodiments, the described systems and methods are configured to allow multiple couriers to gather and deliver multiple packages in an efficient manner.

The method 1100 of FIG. 11 can be modified in any suitable manner. In his regard, step 1112 shows that, in accordance with some embodiments, the described systems and methods can provide estimated pickup times, arrival times, drop-off, optional parties (e.g., couriers, etc.) to include in the transaction, and/or any suitable information that may be applicable to a transaction.

Figure 12B:
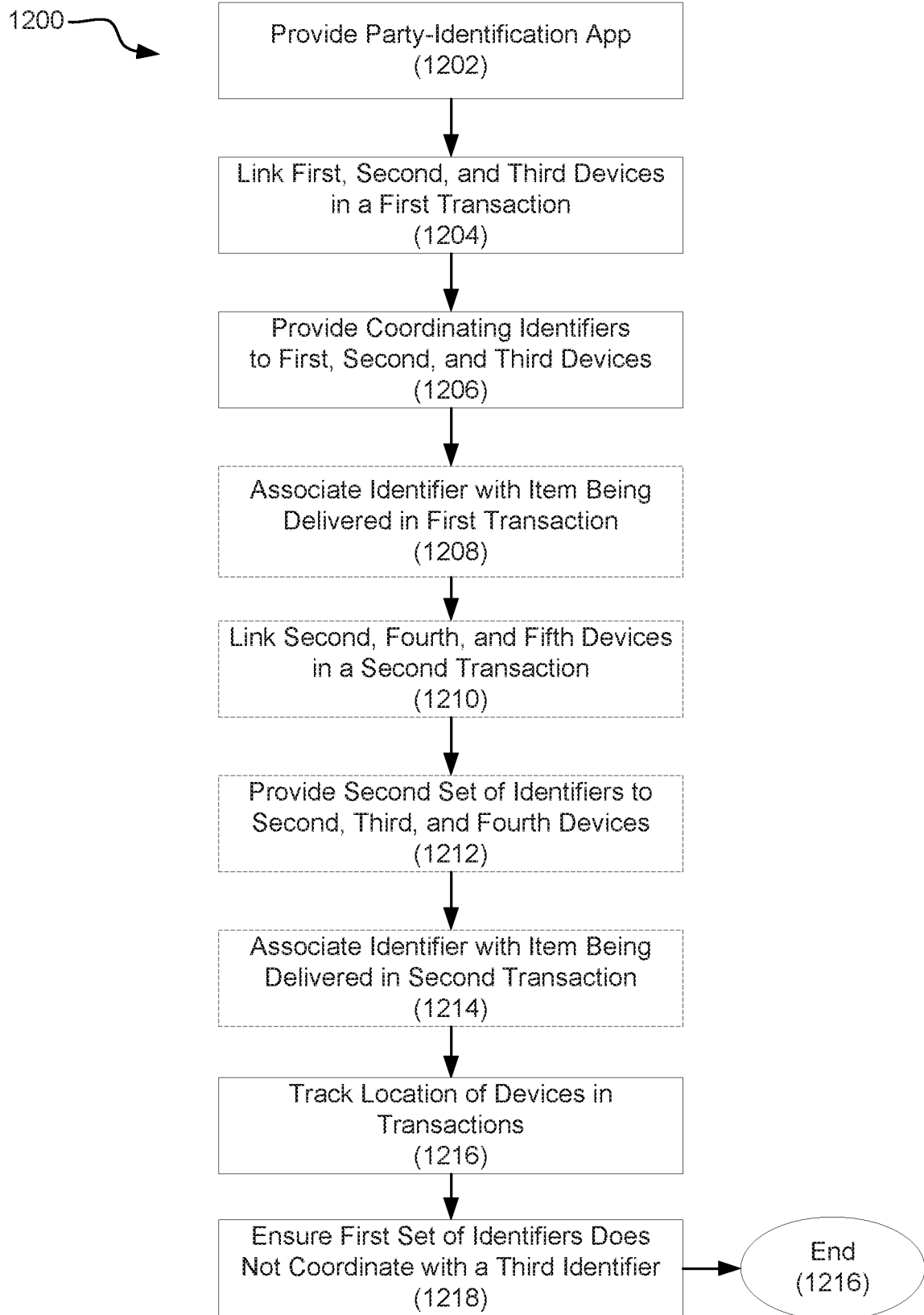
FIG. 12B illustrates a flowchart depicting a representative embodiment of a second method for using the described systems and methods in a courier service.

As another example of a suitable method for using the described systems and methods in courier services, FIG. 12B illustrates a method 1200 that includes (as shown at step 1202) providing a party-identification application (e.g., a website, a mobile app, an app, and/or other software that performs at least some of the described systems and methods) to any suitable number of devices. Indeed, in some embodiments, the described systems include making the party-identification application available to a first device (e.g., a device of a party intending to send goods and/or services (which may collectively and individually be referred to herein as an item) to a third party), a second device (e.g., a device of a deliverer who plans on taking the item (at least partway) to the third party, and a third device (e.g., a device of an intended recipient of the item).

At step 1204, FIG. 12B shows that some embodiments of the method 1200 include linking and/or otherwise placing the first, second, and third devices into a transaction with each other. Additionally, at step 1206, FIG. 12B shows that some embodiments of the method 1200 include providing coordinating identifiers to the devices in the first transaction. In this regard, the coordinating identifiers can be provided to the devices in any suitable manner (e.g., via a processor of the computer system 385, via a processor or one or more of the devices, and/or in any other suitable manner). In this regard, when this description refers to a function being performed by a processor of the computer system and/or a server, it should be noted that were possible such a function may be performed by one or more processors of a computer device (e.g., 365, 375, etc.). In some embodiments, a first set of coordinating identifiers is provided to the first and second devices in the first transaction (e.g., to the devices of a sender and deliverer of an item) and a second set of coordinating identifiers is provided to the second and third devices (e.g., the devices of the deliverer and the intended recipient of the item). Although in some embodiments, the first and second sets of identifiers comprise different identifiers that are readily distinguishable from each other, in some other embodiments, the first and second sets of identifiers coordinate with each other.

In some embodiments, not shown in FIG. 12B, one or more parties to the first transaction are able to optionally pass an identifier from their device to another device such that the other device becomes part of the transaction (see e.g., FIGS. 11 and 12A). For instance, in some embodiments, the second device (e.g., the device of the deliverer) can pass an identifier (e.g., via near field communication, a camera, Wi-Fi communication, BLUETOOTH® communication, text, e-mail, and/or in any other suitable manner) from the first set, second set, and/or any other suitable set of identifiers to one or more other devices to allow the users of such other devices to carry the item for a portion of the trip.

Additionally, step 1208 shows that, in some embodiments, the method 1200 optionally includes associating an identifier that coordinates with the first set of identifiers (and/or another applicable set) with the item (e.g., a package and/or any other suitable good and/or service) that is being transported as part of the first transaction. In this regard, the coordinating identifier can be associated with the item in any suitable manner, including, without limitation, be being printed on the item, being included on a sticker that is attached to the item, being printed on a receipt and/or other object associated with the item, being shown on a display associated with the item, being presented through a speaker associated with the item, by being locatable through the use of a code (e.g., a QR code, bar code, numeric code, alphanumeric code, and/or any other suitable code) that is associated with the item, by being locatable by scanning an RF ID associated with the item, and/or in any other suitable manner. Accordingly, in some embodiments, not only can parties identify other parties in a transaction by matching their identifiers (e.g., manually and/or via their devices), but in some embodiments, one or more parties can identify an item associated with a transaction by matching an identifier associated with such item with one or more identifiers provided by the parties' devices.

Continuing on with the method 1200, steps 1210 through 1214 show that, in some embodiments, the second device, one or more other devices that receive an identifier from the second device, and/or any other device participating in the first transaction can also participate in one or more other transactions. For instance, while the user of the second device (e.g., a deliverer) can enter into a first transaction to take an item from the user of the first device to the user of a third device, the user of the second device can further enter into one or more other transactions, including, without limitation, a transaction to deliver an item from a fourth party to a fifth party.

At step 1216, FIG. 12B shows that some embodiments of the method 1200 further comprise using a processor of the computer system 385 and/or a processor of one or more devices in a transaction to track the location of the various devices in the transaction with respect to each other and/or one or more devices that are part of another transaction. In this manner, the described systems and methods can perform a variety of functions, including, but not limited to, ensuring (e.g., as shown at step 1218) that identifiers from one transaction are readily distinguishable from the identifiers of one or more other transactions (e.g., where devices from the various transactions come or may come into proximity with each other and/or otherwise), modifying one or more identifiers in a set of identifiers as devices in the same transaction come into proximity with each other, providing one or more proposed routes between various devices in a transaction, and/or any other suitable function. Also, while FIG. 12B shows the method 1200 ends at step 1220, the method can be repeated and/or modified in any suitable manner.

With reference now to ticket purchases, the described systems and methods can be used in any suitable manner to improve ticket sales techniques. Indeed, under some current techniques for purchasing tickets, after a person purchases tickets over the phone, online, etc., someone has to go and pick such tickets up (e.g., at will call or elsewhere). That said, under some embodiments, the described systems and methods (as shown by method 1300 in FIG. 13), allow a user to purchase tickets (e.g., on a mobile app, website, and/or other application configured to provide the described systems and methods; over the phone; via e-mail; via text; and/or in any other suitable manner (e.g., as shown at step 1302 in FIG. 13)).

As shown at step 1304, the method 1300 continues as an identifier is assigned to the transaction (e.g., to the customer's cellphone and/or other computer device). In this regard, the identifier can be provided a device in the transaction (e.g., the ticket purchaser's phone or otherwise) at any suitable time and in any suitable manner, including, without limitation, at the time an order is placed, at the time tickets are purchased, as the device comes into proximity with another device in the transaction, and/or at any other suitable time. In some embodiments, however, the identifier is assigned to a transaction at the time tickets are purchased.

Figure 13:
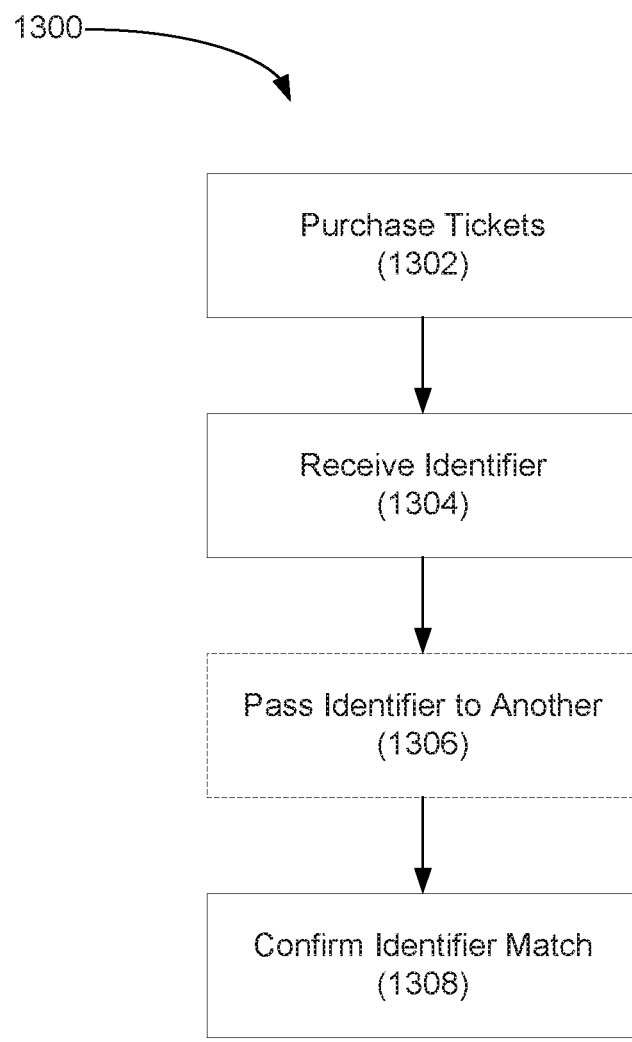
FIG. 13 illustrates a flowchart depicting a representative embodiment of a method for using the described systems and methods for ticket sales.

At step 1306, FIG. 13 shows that the ticket purchaser (and/or any other applicable party) can optionally pass the tickets to one or more other devices (or people) in any suitable manner, including, without limitation, via near field communications, a text, an e-mail, and/or in any other suitable manner. Thus, in some embodiments, an identifier assigned to a transaction can be passed from one person to another, much the same way that physical tickets can be passed. That said, although in some embodiments, as a first party passes one or more identifiers (e.g., serving as tickets) to another party, the first party relinquishes the identifier(s) (and/or tickets), in some other embodiments, as a first party passes the identifier(s) to one or more other parties, the first party (and/or one or more subsequent passing parties) continues to have access to the identifier(s) on the first party's (or another applicable party's) device or otherwise.

At step 1308, FIG. 13 shows that, in some embodiments, the method 1300 continues as a party with the identifier uses the identifier to complete at least a portion of the transaction (e.g., using the identifier as a ticket, in accordance with the method 800 of FIG. 8, and/or otherwise). While this can be done in any suitable manner, in some embodiments, the party who is using the identifier as a ticket compares the identifier with the identifier of another party (e.g., staff at an event) having a coordinating identifier. Thus, in some non-limiting embodiments, the described systems and methods can provide a simple way to purchase and or use tickets, while being able to electronically track and/or pass such tickets.

With reference now to concessions, the described systems and methods can be used in the field of concessions in any suitable manner. In this regard, FIG. 14A illustrates one representative embodiment of a method for using the described systems and methods to allow one or more patrons (and/or any other suitable customer) to purchase one or more items (and/or services) from one or more providers (e.g., concessions stands) and to have the items (and/or services) delivered to the patron by one or more servers, runners, and/or other parties; hereinafter server or servers) in a way that the applicable patron(s) and server(s) can identify each other through the use of coordinating identifiers.

Figure 14A:
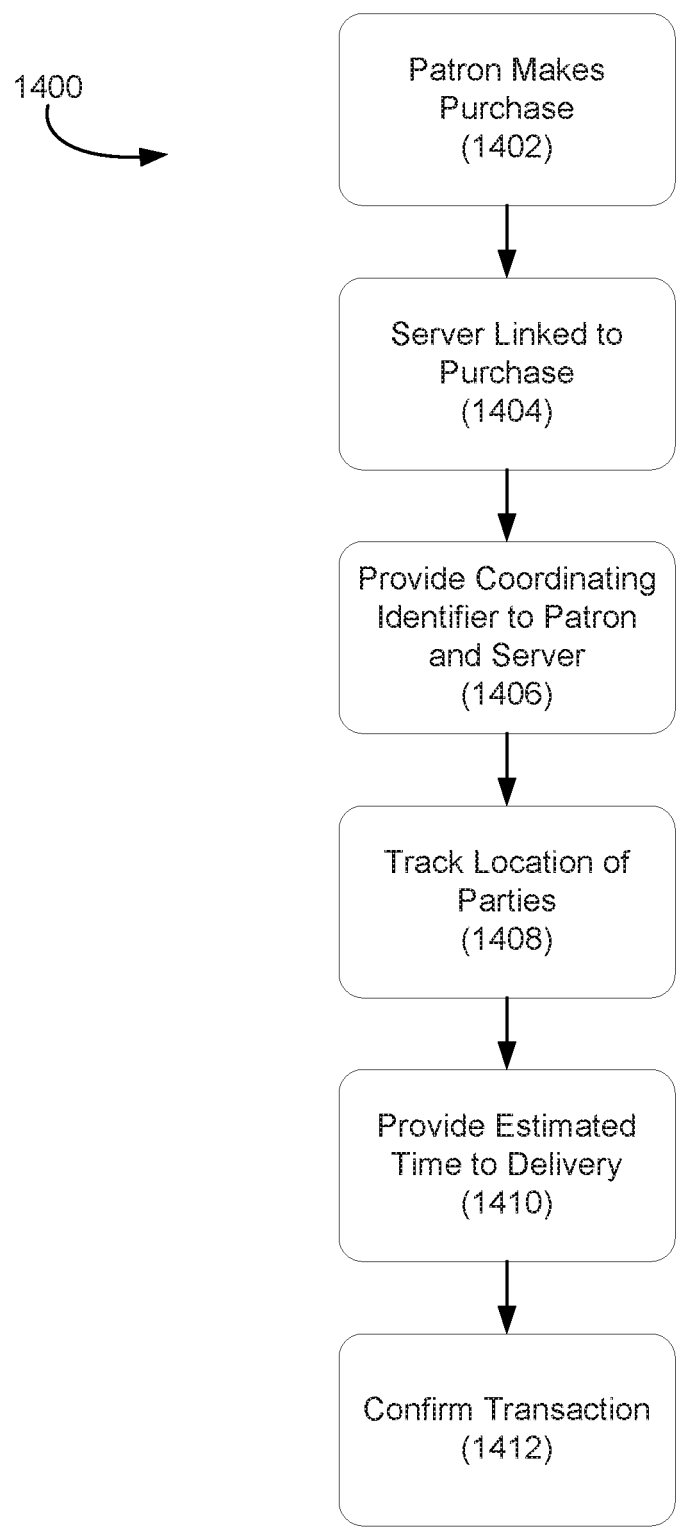
FIG. 14A illustrates a flowchart depicting a representative embodiment of a method for using the described systems and methods to purchase concession items.

While the method 1400 of FIG. 14A can proceed in any suitable manner, step 1402 shows that, in some embodiments, a transaction begins as one or more patrons are allowed to make a purchase. In this regard, the purchase can be made in any suitable manner, including, without limitation, through a website, a mobile app, and/or any other application that provides at least some of the described systems and methods; by making a purchase in person (e.g., making a purchase and then leaving the point of sale); by paying through the patron's computer device; by making one or more orders through the patron's device; by paying in person (e.g., at the time the server delivers the desired goods and/or services), by paying at the time of making an order; and/or in any other suitable manner.

Indeed, in some embodiments, a patron is able to purchase one or more goods and/or services directly through an app that functions in accordance with at least some of the described systems and methods. Additionally, while in some embodiments, a patron is only able to use the described systems and methods to make a purchase from a single concession stand (and/or other provider of goods or services) at a time, in some other embodiments, a patron is able to use the described systems and methods to make one or more purchases from multiple providers, simultaneously or otherwise. By way of non-limiting example, in some embodiments, a patron can purchase one item (e.g., nachos) from a first concession stand, another item (e.g., a hotdog) from another stand, and any other number of items from any other number of providers.

At step 1404, FIG. 14A shows that some embodiments of the method 1400 proceed as one or more servers are linked, assigned to, and/or are otherwise associated with the transaction and/or the patron. In this regard, the servers can be linked with a transaction in any suitable manner, including, without limitation, by being selected based on proximity to a provider and/or a patron (e.g., as determined by the location of server's computer device, the location of a the patron's device, and/or preset location of the provider and/or patron), based on a server's affiliation with a provider providing the patron's selected services, and/or in any other suitable manner. Indeed, in some embodiments, one or more servers at or in proximity to an event can use the described systems and methods to indicate that they are ready to provide a service, and the described systems and methods can select such servers in the manner determined to be most-efficient and/or in any other suitable manner.

At step 1406, FIG. 14A shows that some embodiments of the method 1400 include providing one or more patrons, providers, and/or servers that belong to a transaction with coordinating identifiers. Additionally, at step 1408, FIG. 14A shows that some embodiments of the method 1400 include tracking the location of one or more parties to the transaction (e.g., via GPS coordinates of a phone and/or other computer device of one or more parties, multilateration, localization, information provided by a user, and/or in any other suitable manner). Indeed, in some embodiments, the described systems and methods are configured to provide one or more parties to the transaction with a map showing the position of (and/or a proposed route to) one or more parties to the transaction. In one non-limiting example, the computer devices (e.g., devices 365 and 375) of one or more patrons in a transaction show the locations (in near real-time and/or otherwise) of one or more servers (and/or vice versa) in one or more applicable transactions.

As shown at step 1410, in some embodiments of the described method 1400, one or more parties to a transaction receive an estimated time (and/or updated estimates) indicating an estimated time until parties to a transaction meet (e.g., the server comes to the patron, the patron comes to the server, the patron comes to the provider, etc.). Indeed, in some non-limiting embodiments, the described systems and methods are further configured to automatically update coordinating identifiers based on the proximity of one or more parties to a transaction (e.g., as discussed above with respect to FIG. 6).

At step 1412, FIG. 14A shows that some embodiments of the described method 1400 continue as two or more parties to a transaction are able to confirm that the applicable parties have actually met and/or that at least a portion of the transaction is complete. In this regard, one or more portions of a transaction can be confirmed to be complete in any suitable manner, including, without limitation, by determining that computer devices of two or more parties to a transaction are within a certain proximity of each other (e.g., for any time and/or a set period of time), by having one or more parties provide input to a computer device indicating that at least a portion of the transaction is complete (e.g., by tapping a visually perceptible identifier on a computer device, providing a signature through a computer device, swiping a credit card, making a payment, and/or in any other suitable manner), by having the applicable devices communicate with each other to confirm a transaction (e.g., via near field communications, wirelessly, and/or in any other suitable manner), and/or in any other suitable manner. Indeed, in some embodiments, two or more parties to a transaction simply hold up their devices, displaying coordinating identifiers, such that the parties to the transaction are able to readily match (e.g., visually and/or otherwise) the coordinating identifiers.

The method 1400 shown in FIG. 14A (and/or in any other applicable methods) can be structured in any suitable manner. Indeed, in some embodiments (and as shown in section A of FIG. 14B) each transaction comprises a coordinating identifier 1414 that is provided to a server (shown as the square labeled 1416), a patron (shown as the circle labeled 1418), and/or a provider (not shown). Thus, in some such embodiments, the server and the patron in a transaction can readily identify each other by showing their identifiers to each other and matching their coordinating identifiers.

Moreover, in accordance with some embodiments, the described systems are configured to ensure that an identifier used for a particular transaction is unique to that transaction, at least within a certain location (e.g., as discussed above with respect to FIG. 7). Thus, in FIG. 14B, section A, which depicts a first location (e.g., a first venue, a portion of the first venue, and/or any other suitable location) shows an embodiment with two transactions (one with a plus-symbol-shaped identifier and another with a triangular identifier) that each comprises a server 1416 and a patron, and wherein the respective server and patron for each of the transactions have identifiers that are unique to their transaction (at least in the first location).

Figure 14B:
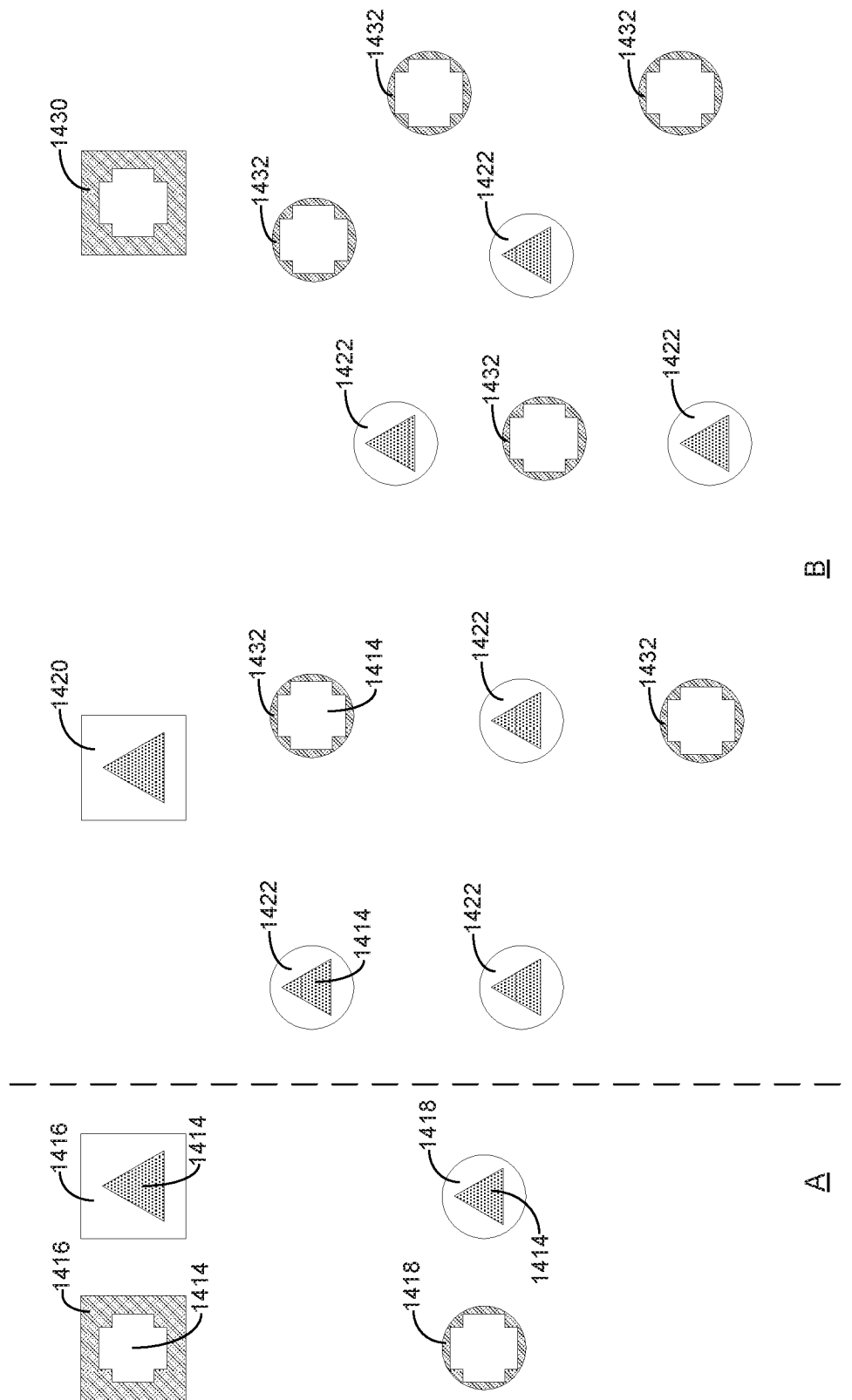
FIG. 14B illustrates a diagram in which computer devices for one server and multiple patrons provide belong to one transaction and share coordinating identifiers.

In contrast, Section B in FIG. 14B, which depicts a second location (e.g., a second venue, a portion of the second venue, and/or any other suitable location) shows that, in some embodiments, one or more patrons 1422 (or 1432) enter into a transaction, one or more servers 1420 (or 1430), and/or providers (not shown); with each of the two transactions comprising an identifier 1414 that is unique to the respective transactions (at least in the second location). Specifically, Section B of FIG. 14B shows an embodiment in which a first transaction (as denoted by the triangular identifiers 1414) comprises a first sever 1420 who is assigned to serve (e.g., provide popcorn and/or any other suitable good or service to) multiple patrons 1422 having a coordinating triangular identifier 1414. Additionally, Section B of FIG. 14B shows an embodiment in which a second transaction (as denoted by the plus-symbol-shaped identifiers 1414) comprises a second sever 1430 who is assigned to serve (e.g., provide drinks and/or any other suitable good or service to) multiple patrons 1432 having a coordinating triangular identifier 1414.

Figure 14C:
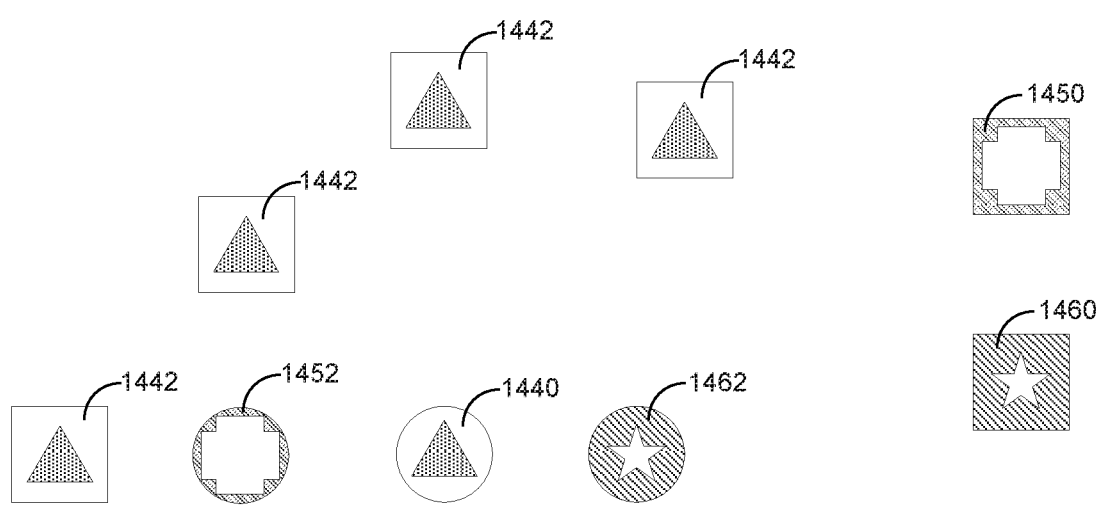
FIG. 14C illustrates a diagram in which computer devices for one patron and multiple servers provide belong to one transaction and share coordinating identifiers.

FIG. 14C further shows that, in some embodiments, one or more patrons can enter into a single transaction with one or more servers and/or providers (not shown), with all members of the transaction having coordinating symbols. Specifically, FIG. 14C shows that, in some embodiments, a first patron 1440 can enter into a first transaction with multiple servers 1442. For instance, the first patron may order from several providers/servers in a single transaction (e.g., with one server bringing nachos, another server bring a drink, another server bringing ice cream, and another server bringing souvenir to the patron). Additionally, FIG. 14C shows that, in some embodiments, the identifiers (e.g., the triangular identifiers) for the first patron 1440 are unique to the first transaction (or are at least unique for a specific location), while other transactions in proximity to the first have differing identifiers (e.g., as shown by the star-shaped and plus-symbol-shaped identifiers in FIG. 14C).

With reference now to queue management, the described systems and methods can be used to manage a queue (e.g., in a restaurant and/or any other suitable eatery, the DMV, a doctor's office, and/or any other suitable location or circumstance) in any suitable manner. Indeed, FIG. 15, at step 1502, shows that some embodiments include allowing one or more people to enter into a transaction involving a queue (i.e., a virtual and/or physical queue). In this regard, such people can enter into a queue in any suitable manner, including, without limitation, by visiting an establishment, a teller, a cashier, a person, and/or other suitable location in person; by entering into the queue online; by sending a text that places such people into the queue; by entering into the queue through an application (e.g., any suitable app, including, but not limited to, an app and/or website that functions in accordance with at least some of the described systems and methods); by entering into the queue over the telephone; by sending a fax that is used to place a person in the queue; and/or in any other suitable manner.

Continuing with the method 1500, step 1504 shows that, in some embodiments, the method continues as one or more parties to the transaction (e.g., the person waiting in the queue and the person (and/or device) attending to people in the queue) receive coordinating identifiers. In this regard, the parties can receive the identifiers at any suitable time, including, without limitation, when it's a parties turn in the queue, when the party enters into the queue, when two or more parties in the transaction come within a set proximity of each other, when requested by such party, after waiting in the queue for a specific period of time, after arriving in a certain position in the queue, and/or at any other suitable time.

Indeed, in some embodiments, a person receives a coordinating identifier (e.g., via that person's computer device 365) when that person enters into the transaction (and/or the queue). In some such embodiments, when a party to the transaction comes to his or her turn in the queue, the coordinating identifier provided on that party's computer device (and/or the computer device of one or more other parties to the transaction) is modified (e.g., one or more of the coordinating identifiers in the transaction are changed, flash, display a message in association with the identifier, and/or the identifier is otherwise modified and/or replaced to indicate that a party's turn has arrived and/or is getting closer) and/or the person is otherwise notified (e.g., via text, email, SMS, vibration, and/or in any other suitable manner) that his or her turn has arrived and/or is approaching. In some other embodiments, however, a party to a transaction receives a coordinating identifier when his or her turn in the queue arrives.

Figure 15:
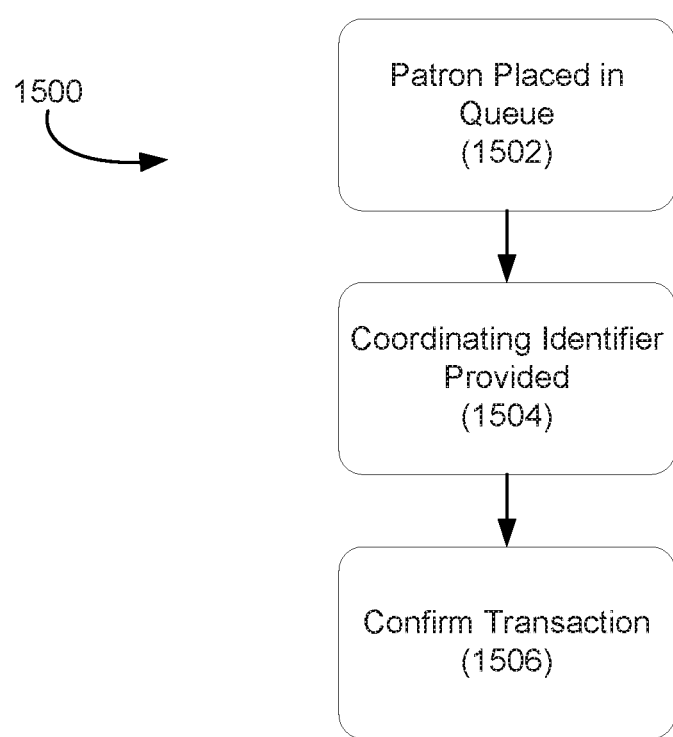
FIG. 15 illustrates a flowchart depicting a representative embodiment of a method for using the described systems and methods to manage one or more queues.

At step 1506, FIG. 15 shows that some embodiments of the method 1500 continue as one or more parties to the transaction identify each other and/or otherwise confirm that at least a portion of the transaction is complete. In this regard, the transaction (or a portion thereof) can be confirmed in any suitable manner. Indeed, in some embodiments, two or more parties to a transaction (e.g., a patron and a maitre d') are able to compare coordinating identifiers to determine that the proper party's turn has arrived (e.g., to be seated, to be serviced, to get on a ride, to enter an establishment, to enter an office, and/or to otherwise receive goods and/or services).

In still other embodiments, however, a transaction (or a portion thereof) is confirmed by determining that computer devices of two or more parties to a transaction and with coordinating identifiers are within a certain proximity of each other (e.g., for any time and/or a set period of time), by having one or more parties provide input to a computer device indicating that at least a portion of the transaction is complete (e.g., by tapping a visually perceptible identifier on a computer device, providing a signature through a computer device, and/or in any other suitable manner), by having the applicable devices communicate with each other to confirm a transaction (e.g., via near field communications, wirelessly, and/or in any other suitable manner), and/or in any other suitable manner.

As previously mentioned, each of the described methods can be modified in any suitable manner. By way of non-limiting illustration, the methods shown in FIGS. 10, 11, and 13-15 can be modified such that one or more identifiers can be: passed from one party in a transaction to another party (e.g., as discussed above with respect to FIGS. 11 and/or 12 or otherwise); modified as a distance between two or more parties in a transaction decreases and/or increases (e.g., as discussed above with respect to FIG. 6 and/or otherwise); modified when one or more other modification factors are met; displayed for the parties in a transaction that are closest to each other (e.g., as discussed above with respect to FIGS. 7 and/or 8 or otherwise); displayed for the party and/or parties that are next in a queue and/or approaching a specific position in a queue (e.g., as discussed above with respect to FIG. 8 or otherwise); and/or otherwise modified in any suitable manner.

As another example of a suitable modification, in some embodiments, any of the described systems and methods is modified to include an identifier that is associated with an item (e.g., one or more goods and/or services). In some such embodiments, when a patron purchases an item, an identifier (e.g., a non-numeric identifier, a non-customer name identifier, a symbol, an icon, and/or any other suitable identifier) is provided to the patron (e.g., on a receipt, on a document separate from a receipt, on the user's device, and/or in any other suitable manner). For instance, in some embodiments in which a patron orders over the patron's computer device, a coordinating identifier is also provided to the patron through the patron's device (e.g., phone). In some other instances, when the patron purchases, orders, and/or otherwise enters into a transaction for an item, the patron receives a receipt, a slip of paper, and/or any other suitable material carrying the identifier.

In the aforementioned example, an item can be associated with a coordinating identifier in any suitable manner. For instance, a sticker comprising the identifier can be stuck on the item, a receipt or other slip of paper comprising the identifier can be placed on or be otherwise associated with the item, a display can show the identifier when the item is available, and/or the identifier can otherwise be associated with the item. Indeed, in some embodiments, after a patron has ordered and item and received an identifier (e.g., a symbol on a receipt, a symbol and/or sound on an electronic device, etc.), the patron can compare that identifier against the identifier associated with the item to readily identify that the item pertains to that patron. For instance, where a patron orders food and the food all orders are set in one place when they are done and ready for pickup, the patron can readily look at the identifiers on some or all of the food products and compare those identifiers against the identifier received by the patron (e.g., on a receipt, on the patron's phone, etc.) to identify the patron's order without needing to touch other people's orders.

As still another example of a suitable modification, some embodiments of the described systems and methods are configured to send a message (e.g., via text, e-mail, phone call, fax, IR signal, Wi-Fi signal, website, and/or in any other suitable manner), indicating a status and/or location of one or more devices in a transaction, indicating that one or more devices in the transaction have come to a desired location, indicating that two or more devices in a transaction are within a set distance from each other, indicating that a package associated with the transaction has reached a certain location, and/or any other suitable information.

In addition to the aforementioned uses, the described systems and methods can further be used to help individuals identify and verify each other for home deliveries, dating (e.g., for blind dates, dates arranged through a website and/or dating app, etc.), classified add purchases (e.g., as individual's who come together through an interaction that began on Craig's List, Angie's List, the newspaper, and/or any other suitable venue meet to make a purchase, close a deal, and/or provide/receive goods and/or services), as parties meet to broker ticket sales (e.g., ticket resale), airport pick up, appointments (e.g., with salesmen, repairmen, missionaries, recruiters, service providers, etc.), breaking groups of people into smaller groups, food delivery, escorting minors on trips (e.g., only placing the minor in the custody of a party that shows a identifier corresponding with the identifier assigned to the minor), and/or any other suitable circumstance in which at least one party wants to identify another party and/or location.

In some embodiments, the described systems and methods can further be used with any suitable service provider (e.g., with an auto mechanic, at the hospital, at a doctor's clinic, at a dentist's office, at a masseuse's office, at a chiropractor's office, and/or at any other suitable place where services are provided). By way of non-limiting example, under some conventional methods for providing healthcare, a patient may regularly have to provide personal information (e.g., name, date of birth, etc.) as the patient receives medical treatment (e.g., when checking in, when getting x-rayed, when getting a shot, when receiving a procedure, and/or at any other suitable time). In accordance with some embodiments of the described systems and methods, however, a patient (and/or a device associated with the patient) is assigned one or more identifiers. Under some such embodiments, instead of needing to provide personal information verbally (e.g., where it may be overheard and possibly used in identify fraud), the patient and one or more service providers (or the service providers' electronic devices) may be provided with coordinating identifiers, allowing the patient and the providers to readily identify each other (e.g., by showing matching identifiers, via near field communications, by scanning each other's QR codes, and/or in any other suitable manner.

In some such embodiments, an identifier associated with a patient may further be passed and/or otherwise provided to one or more other individuals (e.g., service providers, visitors, and/or any other suitable person or device associated with such a person). Thus, in some such embodiments, the described systems and methods can be used to readily identify that the proper parties are present. Additionally, in some embodiments (as in any other method described herein), if a person who has a non-coordinating identifier tries to match the non-coordinating identifier with an identifier from another transaction, the described systems and methods optionally cause one or more devices in the transaction (and/or the device(s) comprising the non-coordinating identifier) to make a sound, provide a visual display, vibrate, and/or otherwise indicate that the identifiers do not coordinate. In some embodiments, the described systems and methods are further configured to send a message (e.g., via text, e-mail, near-field communications, Wi-Fi, cell signal, short wavelength transmission, IR transmission, and/or in any other suitable manner) to provide an alert (e.g., to security, to the police, to a system configured to lock a portion of a facility down, and/or otherwise) that someone tried to match non-coordinating identifiers.

Although in some embodiments, a patient receives an identifier via an electronic device (e.g., a phone, tablet, etc.), in some embodiments, the patient receives a sticker, a printout, a badge, a paper, a receipt, a ticket, and/or some other form of identifier or item comprising an identifier that can be matched by a service provider (e.g., matched visually, matched by scanning, matched by symbol and/or visual identification technology, and/or in any other suitable manner). Indeed, in some embodiments, a patient is given a sticker and/or other identifier that is configured to be placed on a portion of the patient's body to be treated (e.g., operated on and/or otherwise examined or treated) and a service provider can confirm the matching identifier (e.g., by comparing the symbol on the sticker with a symbol on an electronic device and/or in any other suitable manner).

Accordingly, some embodiments of the described systems and methods are configured to: provide coordinating identifiers that are unique for a given location (e.g., to prevent possible confusion and belief that one or more third parties are actually part of a transaction); help parties to a transaction readily and confidently identify each other; reduce the need for additional equipment and/or materials (e.g., restaurant pagers; restaurant buzzers; tickets; printed, non-digital signs displaying the name of an intended party; and/or other materials); save time in identifying parties; help parties to a transaction to properly identify each other in the dark; help one or more parties to a transaction to readily pick another party to the transaction out of a crowd; and/or to otherwise reduce and/or remove shortcomings associated with some conventional methods for identifying parties to a transaction. Additionally, as some embodiments of the described system and method are configured to allow provide at least two-party validation such that both parties can confidently identify the other.

Thus, as discussed herein, the present invention relates to systems and methods for identifying parties through the use of one or more corresponding, computer-coordinated identifiers. In particular, some embodiments of the present invention relate to systems and methods for using a server or other computer system to provide (wirelessly or otherwise) computer-coordinated perceptible identifiers (such as one or more images, light emissions, sounds, touch-perceptible identifiers, and/or other suitable identifiers) to two or more computer devices, with the identifiers received by each of the devices coordinating with each other to allow users of such devices to readily match the identifiers and to thereby identify each other. In some embodiments, the described systems and methods automatically ensure that coordinating identifiers received by computer devices participating in a first transaction do not coordinate with an identifier provided to another device participating in a second transaction when such other device is within a set proximity from one of more of the computer devices associated with the first transaction. Moreover, in some embodiments, the coordinating identifiers received by one or more of the computer devices participating in a transaction are configured to be modified when such devices come into proximity with each other.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for providing coordinating identifiers over a network to multiple remote computer devices, the method comprising:
   providing a party-identification application to a first computer device, a second computer device, and a third computer device;
   using a processor of a server to link the first, second, and third computer devices in a first interaction,
   using the processor to provide the first and second computer devices with a first set of coordinating identifiers, wherein the first set of coordinating identifiers match with each other and are configured to be readily humanly perceived;
   using the processor to provide the second and third computer devices with a second set of coordinating identifiers, wherein the second set of coordinating identifiers match with each other and are configured to be readily humanly perceived;
   using the processor to determine a location of the first, second, and third computer devices; and
   using the processor to automatically check, via electronic communication, an identifier of a fourth computer device pertaining to a second interaction when the fourth computer device is in proximity with at least one of the first computer device and the second computer device and to automatically ensure that the identifier of the fourth computer device does not coordinate with the first set of coordinating identifiers.

2. The method of claim 1, further comprising using the processor to automatically ensure that the second set of coordinating identifiers does not coordinate with an identifier of a fifth computer device pertaining to a third interaction when the fifth computer device is in proximity with the at least one of the third computer device and the second computer device.

3. The method of claim 1, wherein the party-identification application is configured to allow the second computer device to pass an identifier from at least one of the first and second sets of coordinating identifiers to a third-party computer device such that the third-party computer device becomes part of the first interaction.

4. The method of claim 1, wherein the first and second sets of identifiers at least one of (i) coordinate with each other and (ii) comprise substantially similar coordinating identifiers.

5. The method of claim 1, further comprising:
   using the processor of the server to link the second computer device with a fifth computer device and a sixth computer device in a third interaction;
   using the processor to provide the second and fifth computer devices with a third set of coordinating identifiers and to provide the second and sixth computer devices with a fourth set of coordinating identifiers; and
   using the processor to automatically check, via electronic communication, the first, second, third, and fourth sets of coordinating identifiers to automatically ensure that the first and second sets of coordinating identifiers do not coordinate with the third and fourth sets of coordinating identifiers.

6. The method of claim 5, wherein the third and fourth sets of coordinating identifiers at least one of (i) coordinate with each other and (ii) comprises substantially similar coordinating identifiers.

7. The method of claim 5, further comprising using the server to determine a location of the fifth and sixth computer devices, and further comprising using the server to automatically cause the second computer device to display an identifier from one of the first, second, third, and fourth sets of identifiers based on which the of the first, third, fifth, and sixth computer devices are closest to the second computer device.

8. The method of claim 1, further comprising using the processor of the server to automatically modify a first identifier of the first set of coordinating identifiers when a second identifier of the first set of coordinating identifiers is modified such that the modified first identifier coordinates with the modified second identifier, and further comprising using the server to automatically ensure that the modified first and second identifiers do not coordinate with the identifier of the fourth computer device when the fourth computer device is in proximity to the at least one of the first computer device and the second computer device.

9. The method of claim 1, further comprising using the server to cause the first set of coordinating identifiers to automatically be modified when the first and second computer devices come into proximity with each other, and wherein the first set of identifiers each comprise an image.

10. A method for providing coordinating identifiers over a network to multiple remote computer devices, the method comprising:
    providing a party-identification application to a first computer device, a second computer device, a third computer device, a fourth computer device, and a fifth computer device;
    using a processor of a server to link the first, second, and third computer devices in a first interaction and to provide the first, second, and third computer devices with a first set of coordinating identifiers;
    using the processor of the server to link the second, fourth, and fifth computer devices in a second interaction and to provide the second, fourth, and fifth computer devices with a second set of coordinating identifiers; and
    using the processor to automatically check, via electronic communication, the first set of coordinating identifiers and the second set of coordinating identifiers to automatically ensure that the first and second sets of identifiers are readily distinguishable from each other.

11. The method of claim 10, further comprising:
using the server to determine a location of the first, second, third, fourth, and fifth computer devices; and
using the processor to automatically ensure, via electronic communication, that the first set of identifiers does not coordinate with an identifier of a sixth computer device pertaining to a third interaction when the sixth computer device is in proximity with at least one of the first, second, and third computer devices.

12. The method of claim 10, further comprising using at least one of the processor of the server and a processor of the second computer device to cause the second computer device to automatically display a visually perceptible identifier from the first set of identifiers when at least one of the first and third computer devices are closer to the second computer device than at least one of the fourth and fifth computer devices.

13. The method of claim 10, wherein the party-identification application is configured to allow the second computer device to pass an identifier from the first set of identifiers to a third-party computer device such that the third-party computer device becomes part of the first interaction.

14. The method of claim 10, further comprising using the processor of the server to automatically cause a modification of each identifier in the first set of coordinating identifiers upon an electronic request that one of the identifiers of the first set of coordinating identifiers be modified, and further comprising using the server to automatically check, via electronic communication, the modified identifiers of the first set of coordinating identifiers and the identifier of the fourth computer device to automatically ensure that the modified identifiers of the first set of identifiers are distinguishable from the identifier of the fourth computer device when the fourth computer device is in proximity to the at least one of the first, second, and third computer devices.

15. A method for providing coordinating identifiers over a network to multiple remote computer devices, the method comprising:
providing a party-identification application to a first computer device, a second computer device, and a third computer device;
using a processor of a server to link the first, second, and third computer devices in a first interaction and to provide the first, second, and third computer devices with a first set of coordinating identifiers;
associating an identifier coordinating with the first set of identifiers with an item to be passed from a user of the first computer device, to a user of the second computer device, and to a user of the third computer device;
using the processor to determine a location of the first, second, and third computer devices; and
using the processor to automatically check, via electronic communication, an identifier of a fourth computer device pertaining to a second interaction when the fourth computer device is in proximity with at least one of the first computer device and the second computer device and to automatically ensure that the identifier of the fourth computer device does not coordinate with the first set of coordinating identifiers.

16. The method of claim 15, further comprising
providing the party-identification application to a to the fourth computer device and a fifth computer device;
using the processor of the server to link the second, fourth, and fifth computer devices in a second interaction and to provide the second, fourth, and fifth computer devices with a second set of coordinating identifiers; and
using at least one of the processor of the server and a processor of the second computer device to automatically cause the second computer device to display visually perceptible identifier from the first set of identifiers when the second computer device is closer to at least one of the first and third computer devices than to at least one of the fourth and fifth computer devices, and to automatically cause the second computer device to display a visually perceptible identifier from the second set of identifiers when the second computer device is closer to the at least one of the fourth and fifth computer devices than to the at least one of the first and second computer devices.

17. The method of claim 15, further comprising using at least one of the processor of the server, a processor of the first computer device, a processor of the second computer device, and a processor of the third computer device to automatically provide a proposed route to be taken to deliver the item from the user of the first computer device, to the user of the second computer device, and to the user of the third computer device, and wherein at least a portion of the proposed route is provided to the first, second, and third computer devices.

18. The method of claim 15, wherein the party-identification application is configured to allow the second computer device to pass a humanly perceptible identifier from the first set of identifiers to a third-party computer device such that the third-party computer device becomes part of the first interaction.

19. The method of claim 15, further comprising using the processor of the server to automatically visually modify each identifier in the first set of identifiers upon a request from at least one of the first, second, and third computer devices that one of the identifiers of the first set of identifiers be modified.

20. The method of claim 15, further comprising using the server to cause the first set of identifiers to automatically be modified when the first and second computer devices come into proximity with each other.

* * * * *